United States Patent
Kateman et al.

(10) Patent No.: US 7,131,279 B2
(45) Date of Patent: Nov. 7, 2006

(54) METHOD AND APPARATUS FOR PRODUCING AND DISPENSING AN AERATED AND/OR BLENDED FOOD PRODUCT

(75) Inventors: Paul Kateman, Wellesley, MA (US); Charles S. Brunner, N. Reading, MA (US)

(73) Assignee: Moobella, LLC, Taunton, MA (US)

( * ) Notice: Subject to any disclaimer, the term of this patent is extended or adjusted under 35 U.S.C. 154(b) by 248 days.

(21) Appl. No.: 10/971,796

(22) Filed: Oct. 22, 2004

(65) Prior Publication Data

US 2005/0198990 A1 Sep. 15, 2005

Related U.S. Application Data

(60) Continuation of application No. 10/726,815, filed on Dec. 3, 2003, now Pat. No. 6,952,928, which is a division of application No. 10/160,674, filed on Jul. 31, 2002, now Pat. No. 6,698,228.

(60) Provisional application No. 60/336,252, filed on Nov. 2, 2001.

(51) Int. Cl.
*F25C 1/14* (2006.01)

(52) U.S. Cl. .......................... 62/71; 62/354

(58) Field of Classification Search ................. 62/71, 62/135, 137, 352, 354
See application file for complete search history.

(56) References Cited

U.S. PATENT DOCUMENTS

| | | | | |
|---|---|---|---|---|
| RE28,924 E | * | 8/1976 | Neumann et al. | 62/320 |
| 6,698,228 B1 | * | 3/2004 | Kateman et al. | 62/346 |
| 6,952,928 B1 | * | 10/2005 | Kateman et al. | 62/71 |
| 7,052,728 B1 | * | 5/2006 | Kateman et al. | 426/515 |

* cited by examiner

*Primary Examiner*—William E. Tapolcai
(74) *Attorney, Agent, or Firm*—Mintz, Levin, Cohn, Ferris, Glovsky and Popeo, P.C.

(57) ABSTRACT

A method of dispensing a food product composed of a plurality of ingredients which are mixed to form the food product, includes the steps of providing a rotary surface having a rotary axis and a periphery, mixing together first and second fluid ingredients to form a liquid product mix, depositing the liquid product mix onto the surface while rotating the surface so that the liquid product mix spreads out on the surface in a layer, cooling the surface to a temperature low enough to at least partially freeze said layer to form a frozen product body, removing the product body from the surface as product body scrapings, and collecting and compacting the scrapings to form the food product. Apparatus for carrying out the method is also disclosed.

20 Claims, 13 Drawing Sheets

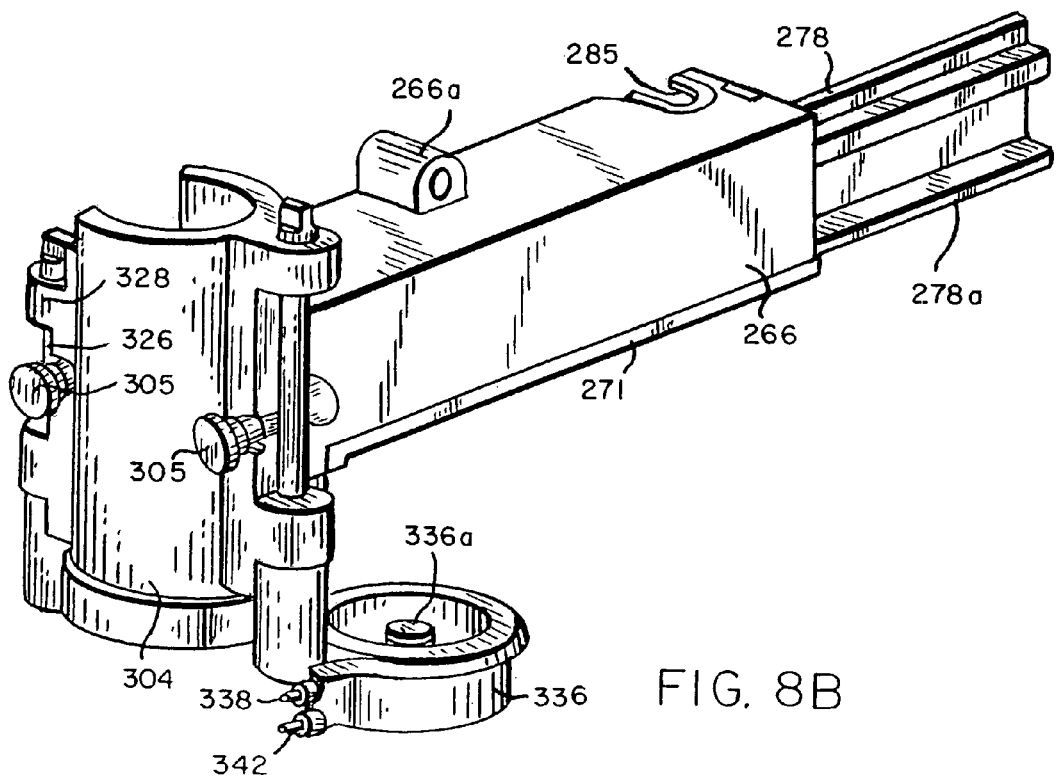
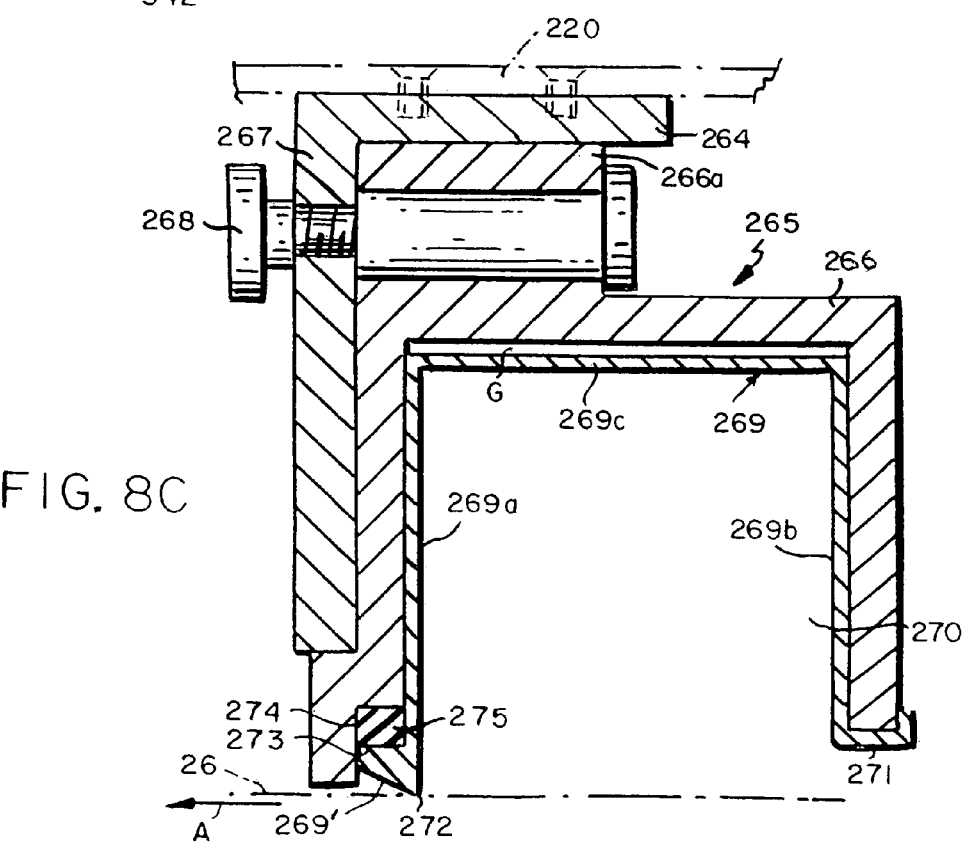

METHOD AND APPARATUS FOR PRODUCING AND DISPENSING AN AERATED AND/OR BLENDED FOOD PRODUCT

CROSS-REFERENCE TO RELATED APPLICATIONS

This application is a continuation of Ser. No. 10/726,815, filed Dec. 3, 2003, now U.S. Pat. No. 6,952,928, which is a division of Ser. No. 10/160,674, filed Jul. 31, 2002, now U.S. Pat. No. 6,698,228, which claims the benefit of Provisional Application No. 60/336,252, filed on Nov. 2, 2001.

BACKGROUND OF THE INVENTION

1. Field of the Invention

This invention relates to a method and apparatus for producing and dispensing aerated and/or blended food products. While the invention may be used to produce a variety of products, it has particular application to the production and dispensing of frozen confections such as ice cream and frozen yogurt. Consequently, we will describe the invention in that context. It should be understood, however, that various aspects of the invention to be described also have application to the making and dispensing of various other food products.

2. Description of the Prior Art

Aerated frozen food products generally require the mixing of selected liquid ingredients with a prescribed volume of air and freezing of the resultant mixture and dispensing of the finished product. The desirability of the finished product is often related directly to the manner and to the degree in which the air is metered and blended with the liquid ingredients of the mixture, referred to as overrun, and the manner in which the blended mix is frozen and then dispensed. The prior art is replete with examples of apparatus for dispensing ice cream and other semi-frozen dairy products such as soft ice cream and frozen yogurt.

Conventionally, such machines are usually dedicated to dispensing one or two flavors of product and, in some cases, a combination of the two. For example, in an ice cream shop, there may be one machine with two separate freezing chambers for making and dispensing chocolate and vanilla ice cream, a second two-chamber machine for making and dispensing strawberry and banana ice cream, a third machine dedicated to making and dispensing coffee and frozen pudding flavors, and so on. The reason for this is that each chamber typically contains a volume of ice cream greater than is required for a single serving. In order to dispense a different flavor ice cream, that chamber must be emptied and cleaned before the new flavor can be made in that chamber and appear at the outlet of the dispenser. Additionally, the vat of preflavored mix from which the frozen product is made must also be very clean. While high volume ice cream shops and confectionery stores may have sales to justify the presence of several dispensing machines dispensing many different products and flavors, smaller sales outlets can usually only afford one or two such machines and are thus restricted in the number of flavors that they can offer to customers.

Further, because the product is typically formed in a quantity that is greater than that to be dispensed at any one serving, the excess product remains in the chamber after formation and until additional servings draw it down. The excess is thus subjected to further freezing which promotes crystallization. Because of the relatively large quantity of the premixed flavors, and the continuous freezing of several quarts of the product, the freshness and palatability of the product may be adversely affected in outlets with relatively slow sales of the product.

Another disadvantage of the prior dispensers is that they have many interior surfaces and moving parts that are difficult and time consuming to clean and maintain at the end of each day or at intervals prescribed by local Health Department regulations. Each dispenser must be purged of any remaining product, and it's chamber walls, pumps and other internal parts cleaned thoroughly to prevent growth of bacteria that could contaminate the product being delivered by the dispenser. Not only is the cleaning operation expensive in terms of down time, it is also costly in terms of product waste and is an unpleasant and difficult job to get employees to do properly.

U.S. Pat. No. 5,433,967 discloses a method and apparatus for producing and dispensing an aerated product which includes a mixing chamber having a first inlet for receiving a liquid, a second inlet for receiving a gas, and an outlet leading to a continuous tube which has a relatively small cross section. The tube has one end positioned to receive the fluid effluent from the mixing chamber outlet and its other end is spaced from that outlet so that the effluent is subjected to confined turbulent mixing in the tube until the fluid product is discharged from the other end of the tube. If that product is to be cooled, the tube leads to a cooling zone or surface which cools and at least partially freezes the liquid product issuing from that tube. The apparatus disclosed there is especially suitable for making and dispensing frozen yogurt and ice cream and allows for the service of individualized fresh product portions in a variety of flavors.

U.S. Pat. No. 5,727,713 discloses a dispenser product supply unit which includes a pressurizable container for containing a product liquid or base and having an opening leading into one end of a conduit. Formed integrally in the conduit is a mixing chamber at which a gas may be added to the liquid, followed by an elongated tube for causing turbulent flow of the mixed fluids. Side branches from the conduit may also be present for introducing one or more flavors into the fluid flowing through the conduit. The opposite or outlet end of the conduit may be coupled to a distribution manifold that can distribute the aerated liquid issuing from the turbulence tube onto a freezing surface as a relatively thin layer. The container, conduit and side branches constitute a one-piece disposable structure which is especially suitable for producing and dispensing flavored dairy products from an associated dispensing apparatus in an efficient and sanitary manner.

While the apparatus described in the above patents, the contents of which are hereby incorporated herein by reference, have existed separately in the prior art, until now no way has been found to combine them into a single machine capable of efficiently and economically making and dispensing different frozen food confections in a wide variety of flavors and in different formats, e.g. as a cup or cone.

SUMMARY OF THE INVENTION

Accordingly it is an object of the present invention to provide improved apparatus for making, mixing and/or dispensing various food products on demand.

Another object of the invention is to provide apparatus for producing and dispensing various food products which does not require the maintenance of a large supply of pre-flavored mixes and/or a large supply of finished product within the apparatus.

Still another object in the invention is to provide such apparatus which facilitates changing substantially immediately from one product type to another to satisfy the demands of individual customers.

A further object of the invention is to provide apparatus for producing and dispensing individualized portions of freshly aerated flavored frozen products on demand and in different formats, e.g. as a cup or cone.

Yet another object of the invention is to provide apparatus for producing and dispensing aerated frozen products which is easy to clean and to maintain in a sanitary condition.

Another object is to provide apparatus for selectively mixing or blending many different flavors while aerating a base product such as a neutral ice cream, fat-free ice cream, soy, sorbet or yogurt base.

An additional object is to provide a frozen product-dispensing machine which has a minimal product carryover from one serving to the next, e.g. which prevents a serving of vanilla ice cream from being contaminated by residue from a prior serving of chocolate ice cream.

A further object of the invention is provide apparatus for this general type which occupies a relatively small amount of floor space while being able to dispense food products having a wide variety of bases, flavors and mix-ins.

Still another object of the invention is to provide apparatus of this type which maintains the product supply under sanitary conditions until it is dispensed.

A further object of the invention is to provide apparatus for effectively and efficiently carrying out the dispensing methods disclosed in the above patents.

Yet another object of the invention is to provide a method of producing and dispensing various food products which produces one or more of the above advantages.

Other objects will, in part, be obvious and will, in part, appear hereinafter. The invention accordingly comprises the several steps and the relation of one or more of such steps with each of the others, and the features of construction, combination of elements and arrangements of parts which will be exemplified in the following detailed description, and the scope of the invention will be indicated in the claims.

Briefly, our product dispensing apparatus is preferably a self-contained unit housed in a cabinet having a door containing a product selection control panel and a portal providing access to a product dispensing station including a vertically moveable tray which can support a product container such as a cup or cone placed on the tray. The apparatus includes a rotary horizontal freezing surface and motive means for rotating that surface about an axis. The freezing surface constitutes the evaporator component of a closed-loop refrigeration system situated in the cabinet. When the refrigeration system is in operation, it maintains the surface of the freezing surface at a selected temperature which is low enough to freeze or partially freeze a liquid product mix such as sorbet, yogurt or ice cream mix deposited on that surface.

Spaced above the freezing surface is a turret section including a turret having a plurality of pumpable containers filled with different liquid flavors and supported on a rotary manifold. The manifold defines a plurality of mixing chambers, one for each container, and a separate turbulence tube leading from each mixing chamber to a separate outlet port in a depositing head over the freezing surface. Each container is connected to one of the mixing chambers of the manifold and motive means are provided for rotating the turret independently of the freezing surface, about an axis located above the freezing surface.

Disposed adjacent to the turret are product base delivery means including one or more vertically moveable nozzles or fittings each of which receives compressed air and a different one of a plurality of liquid product bases pumped thereto from bulk supplies stored in the cabinet. Each of the aforesaid nozzles, when operative, may deliver to the turret a liquid product base along with air (or not). By rotating the turret to position a selected mixing chamber of the manifold opposite a selected one of the delivery means nozzles, and lowering the nozzles to establish connections to that chamber while activating appropriate pumps, the selected product base with or without air delivered by a nozzle is brought together with the selected flavor pumped from a flavor container. The two fluids are then intimately mixed together in the manifold and conducted to the manifold's depositing head so that a fixed volume or portion of the selected flavored and aerated (or not) product mix is deposited on the freezing surface.

The apparatus also comprises a stationary product delivery section disposed between the turret section and the freezing surface. The delivery section has product mix leveling means in the form of a radially oriented self-cleaning roller having a conical surface spaced above the freezing surface. When the freezing surface is rotated, the liquid product mix deposited thereon by the turret section is spread out and leveled to the height of the gap between the roller and the freezing surface. Resultantly, the surface freezes or partially freezes the leveled product mix to form a thin, flat layer of frozen, flavored, aerated (or not) product. The delivery section also includes a radial scraper angularly spaced behind the roller which scrapes the layer of frozen product from the rotating freezing surface and gathers it into a radially extending ridge row of frozen scrapings which row is aligned with a vertically oriented forming cylinder located at the periphery of the delivery section just beyond the edge of the freezing surface.

The delivery section also has a radially moveable scraping blade which operates in conjunction with the radial scraper to push the ridge row of frozen product through a side window of the forming cylinder to gather and compress the frozen product within that cylinder. As will be seen, when the scraping blade is fully extended, it actually closes the window in the cylinder allowing a piston moveable along the cylinder to further compact the product into a scoop shape and push the scoop of frozen product out the bottom of the cylinder into a container, e.g. a cup or cone, which has been placed on the tray at the product dispensing station and raised to position the container at a selected elevation under the forming cylinder. After the container is filled, the tray is lowered so that the container may be removed from the tray through the portal in the cabinet door.

As will be described in more detail later, provision is made for cleaning the freezing surface, leveling roller, forming cylinder and piston between servings to minimize product carryover from one serving to the next. Also as will become apparent, the apparatus is designed so that all critical components of the apparatus are readily accessible for cleaning and routine maintenance. Thus, the present apparatus is able to efficiently and effectively dispense, on demand, a variety of food products for a prolonged period of time and requires only a minimum amount of maintenance.

It should also be understood that various aspects of the invention may be used to mix, blend and dispense various other hot or cold food products such as hot chocolate, instant soups, juices and even candy, cookies, omelets, crepes and the like.

BRIEF DESCRIPTION OF THE DRAWINGS

For a fuller understanding of the nature and objects of the invention, reference should be made to the following detailed description taken in connection with the accompanying drawings, in which:

FIG. 8B is a similar view from above of a portion of that assembly;

FIG. 8C is a sectional view on a larger scale taken along line 8C—8C of FIG. 8A;

DESCRIPTION OF THE PREFERRED EMBODIMENT

Figure 1:
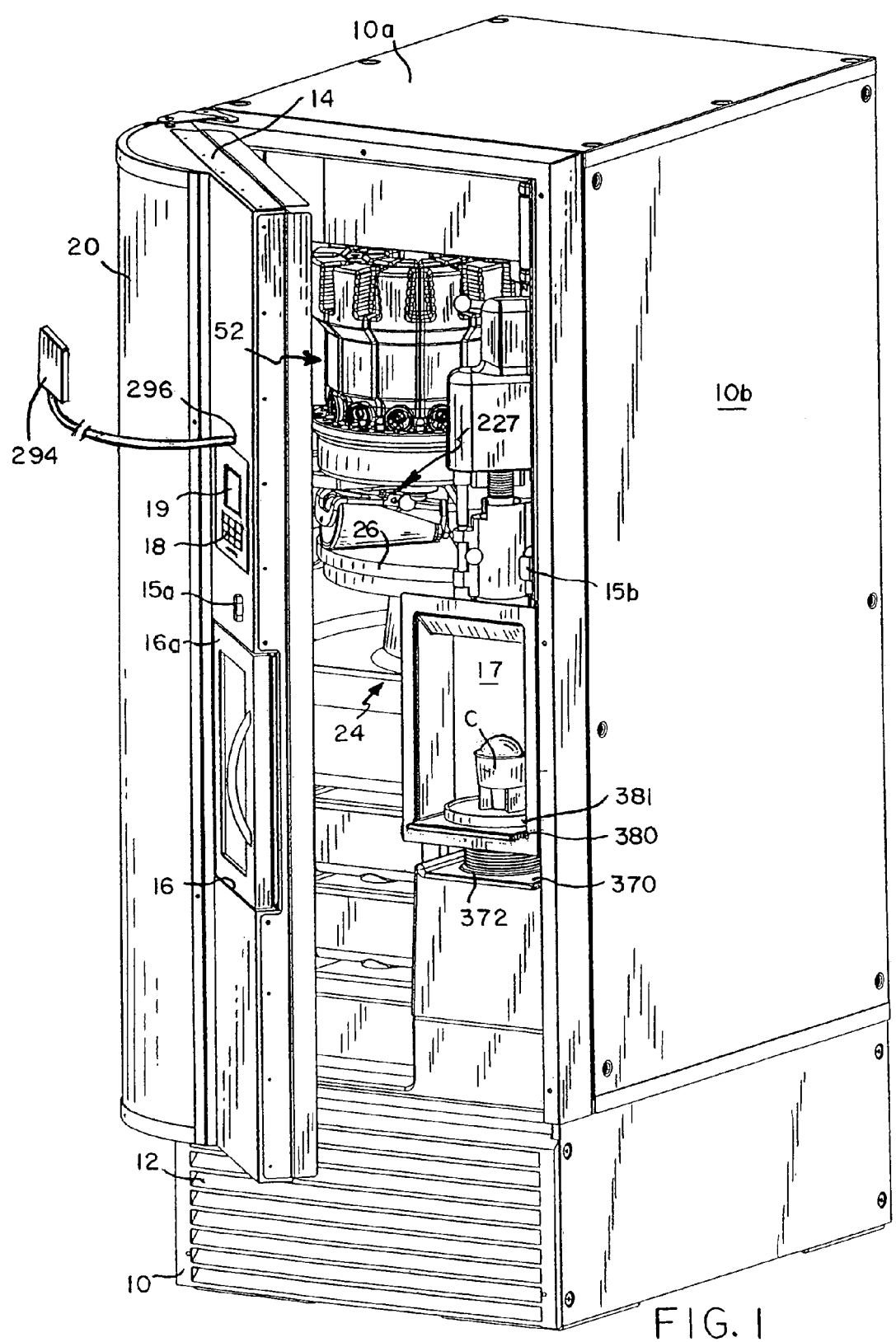
FIG. 1 is a perspective view of dispensing apparatus incorporating the invention with the front door of the apparatus shown partially open.
Figure 2:
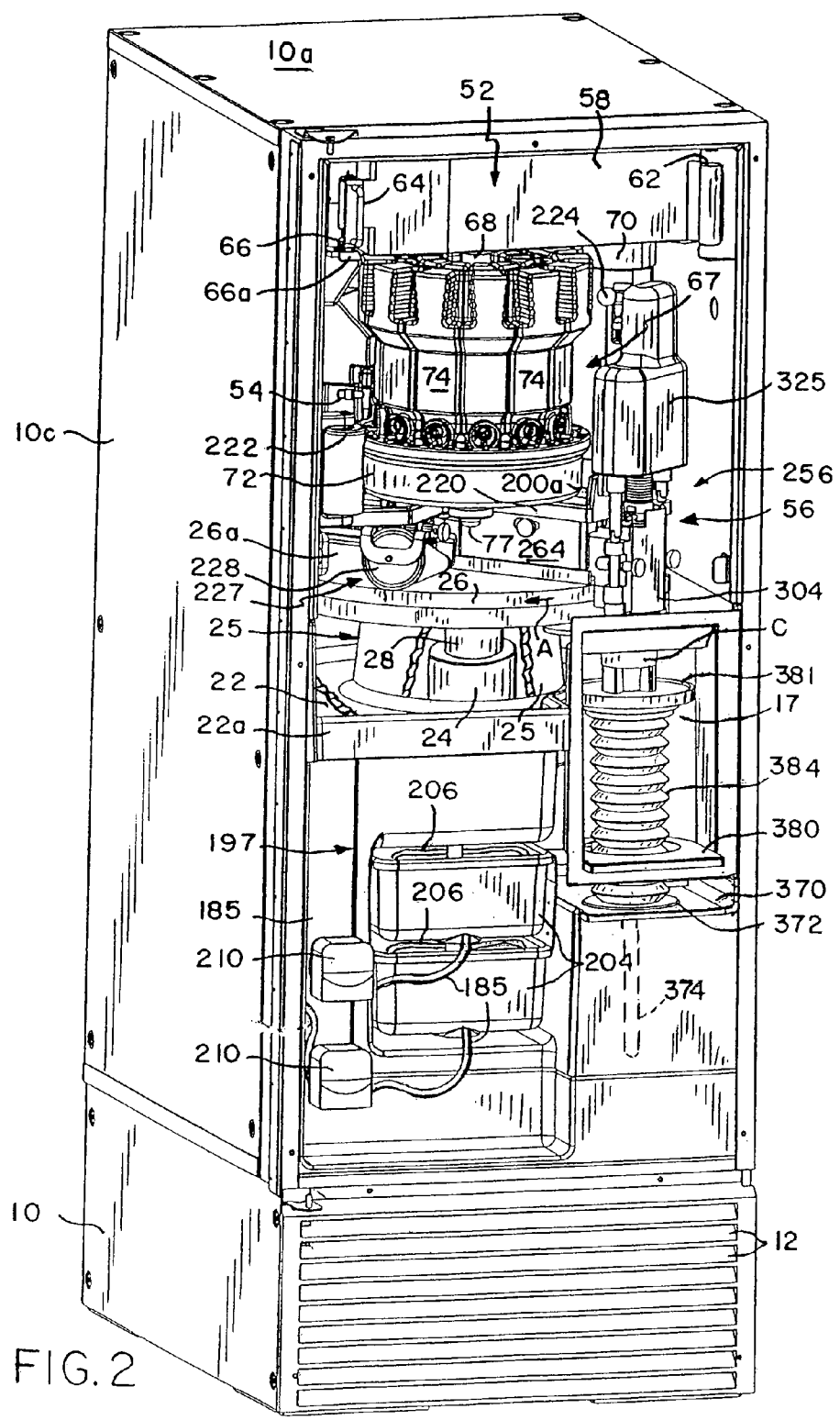
FIG. 2 is a similar view of the FIG. 1 apparatus on a slightly larger scale with the front door removed and with the apparatus' turret section and delivery section shown in their closed positions.

Referring to FIGS. 1 and 2 of the drawings, our dispensing apparatus is a stand-alone unit housed in a cabinet 10 having a top wall 10a, opposite sidewalls 10b and 10c as well as rear and bottom walls (not shown). The front of the cabinet is open for the most part except for a low front wall 12 containing louvers to provide inlet air to the primary refrigeration unit. The front opening into the cabinet may be closed by a hinged door 14 which may be swung between an open position wherein the door allows access to the interior of the cabinet and a closed position wherein the door covers the opening into the cabinet. Suitable means 15a, 15b are provided for latching or locking the door in it's closed position.

As shown in FIG. 1, a relatively large opening or portal 16 is provided in door 14 so that when the door is closed, the portal 16 provides access to a dispensing station 17 within the cabinet at which a customer may pick up a food product dispensed by the apparatus. Preferably, the portal is provided with a swing-out door 16a so that the portal is normally closed blocking access to station 17. A customer may select the particular product to be dispensed by depressing the appropriate keys of a control panel 18 mounted in door 14 after viewing product availability on an electronic display 19 above panel 18. In the event the apparatus is being used as an automatic vending machine, the control panel 18 may include the usual mechanisms for accepting coins, debit cards and currency and possibly delivering change in return. For advertising purposes, an illuminated display 20 may be built into the front of door 14 as shown in FIG. 1.

Figure 5:
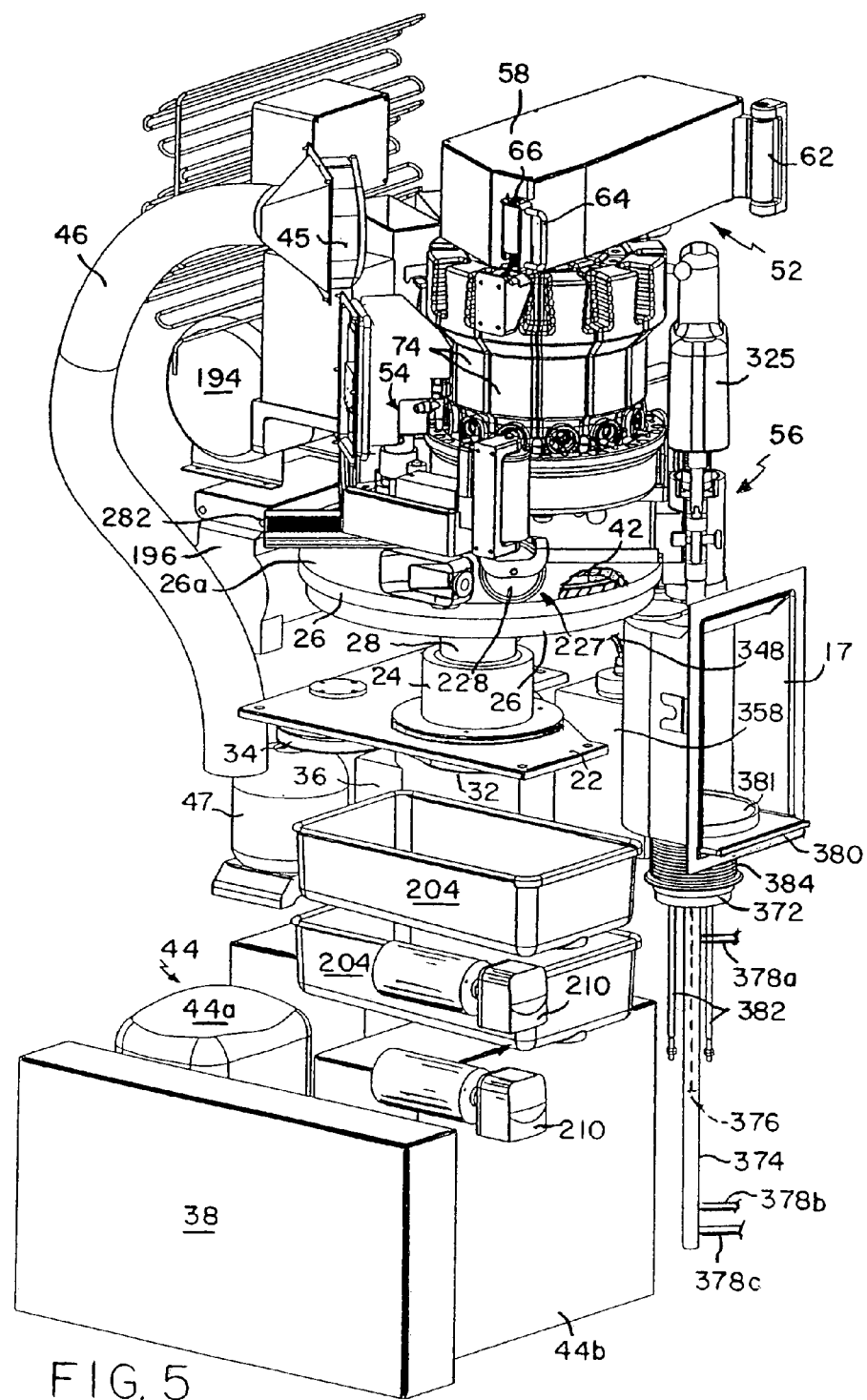
FIG. 5 is a right front perspective view of the FIG. 1 apparatus devoid of the cabinet and other parts.

Referring now to FIGS. 2 and 5, the cabinet 10 includes a horizontal shelf 22 supported by the cabinet walls more or less midway along the height of the front opening into the cabinet. A pan 22a may sit on shelf 22 as shown in FIG. 2 to catch fluid droppings. Shelf 22 includes an upstanding rotary coupling 24 covered by a boot 25 and which rotatably supports a horizontal freezing surface 26. As shown in FIG. 5, freezing surface 26 has a depending shaft 28 which extends down into the rotary coupling 24, the input shaft of the coupling carrying a pulley 32 which is coupled by a belt, and perhaps an idler mechanism 34, to the shaft of an electric motor 36 mounted to the underside of shelf 22. Under the control of a controller 38 in cabinet 10, motor 36 may be activated to rotate freezing surface 26 at a controlled speed in the direction of the arrow A shown in FIG. 2. As we shall see, controller 36 is programmed to control all aspects of the apparatus including control of the speed and temperature of surface 26, the timing of various operations to be described, the operation of interlocks, base product and flavor selections, etc.

Referring to FIG. 5, freezing surface 26 contains an internal spiral or sinuous fluid conduit or path 42 whose opposite ends are connected via rotary coupling 24 to fluid lines (not shown) leading to and from a refrigeration system shown generally at 44 and which operates under the control of controller 38. Suitable couplings with rotary fluid seals will be described later in connection with FIGS. 12A and 12B.

Figure 11:
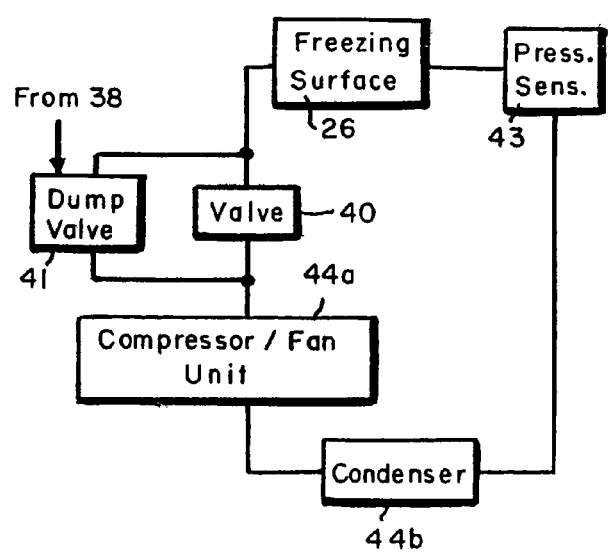
FIG. 11 is a block diagram of the refrigeration loop in the FIG. 1 apparatus.

Referring to FIGS. 5 and 11, refrigeration system 44 comprises a primary compressor 44a, and a primary condenser and fan unit 44b. When the dispensing apparatus is in operation and the freezing surface 26 is rotating, the refrigeration system 44, under the control of controller 38, circulates refrigerant through the freezing surface so as to cool the upper surface 26a thereof to a selected low temperature, e.g. −5 to +17° F.

Preferably, freezing surface 26 is a direct expansion freezing surface, i.e. it functions as the evaporator component in the closed refrigerant loop of the refrigeration system 44, and the refrigeration control circuit in controller 38 has two modes of operation, to wit: STANDBY and DUMP. The STANDBY mode is operative during inactive periods of the apparatus to maintain the upper surface 26a of freezing surface 26 at a specified temperature $T_1$, e.g. 0° F. The DUMP mode is operative during periods of active product production. Since product production is intermittent, the refrigerator control circuit can switch frequently between the two modes.

The STANDBY mode uses a standard expansion valve 40 in the refrigeration loop of system 44 whose valve orifice is sized to control the temperature of freezing surface 26 to maintain the upper surface 26a at the temperature $T_1$. Due to the limits of the expansion valve, this control mode cannot provide the heat removal required to freeze the product mix on surface 26a. Therefore, the DUMP mode is utilized to provide a high rate of heat removal from the upper surface 26a. The DUMP mode of operation utilizes a second, or so-called dump valve 41, that is connected in parallel with the standard expansion valve in the loop of refrigerator system 44. This mode provides a high heat removal rate from upper surface 26a by flooding the refrigerant conduit 42 in surface 26 with liquid refrigerant. As the refrigerant changes state to a gas in surface 26 (i.e. the evaporator component of the refrigeration loop), it cools the portion of the surface 26 adjacent conduit 42 to a temperature $T_2$, that is appreciably lower than $T_1$. This creates a large temperature differential with the upper surface 26a causing the temperature of that surface to drop rapidly.

In order to prevent the surface 26a from dropping below temperature $T_1$, the depositing of product mix on surface 26a by turret section 52 is initiated and the refrigerant modes are switched simultaneously, or within a short period of time. This sets up a large temperature differential between the lower portion of surface 26 and the product mix being applied to the upper surface 26a thereof creating a high heat transfer rate. When the turret section stops applying product to surface 26 and the proper product temperature has been achieved, the refrigeration control system 44 changes the operating mode from DUMP back to STANDBY until the dispensing process is ready to be initiated again.

For this application, the orifice of the dump valve is sized intentionally to prevent the liquid refrigerant from changing state to refrigerant gas. The intended effect of this is to allow liquid refrigerant to flow into the evaporator, i.e. surface 26. Heat added to the evaporator, i.e. surface 26, by the depositing of the relatively warm product mix on that surface will cause the liquid refrigerant in surface 26 to change state to a gas.

The dump valve can be any type of metering or throttling device. In some applications, it may be desirable to use a manually set bypass valve, such as a needle valve or a capillary tube, which is operative in the DUMP mode to cause the aforesaid refrigerant gasification in surface 26.

Figure 3:
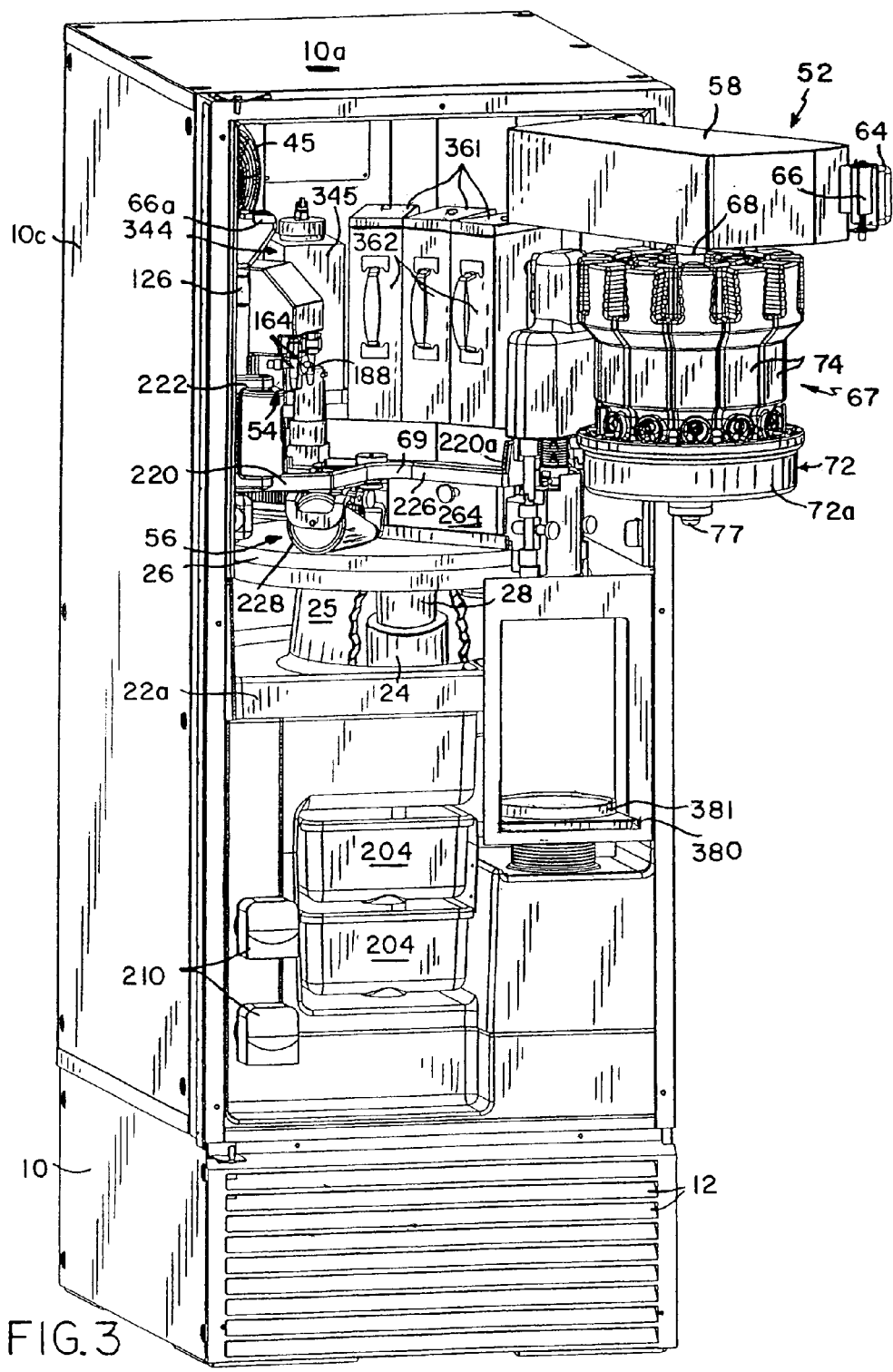
FIG. 3 is a similar view of the apparatus with its turret section shown in the open position and the delivery gate cover removed.
Figure 4:
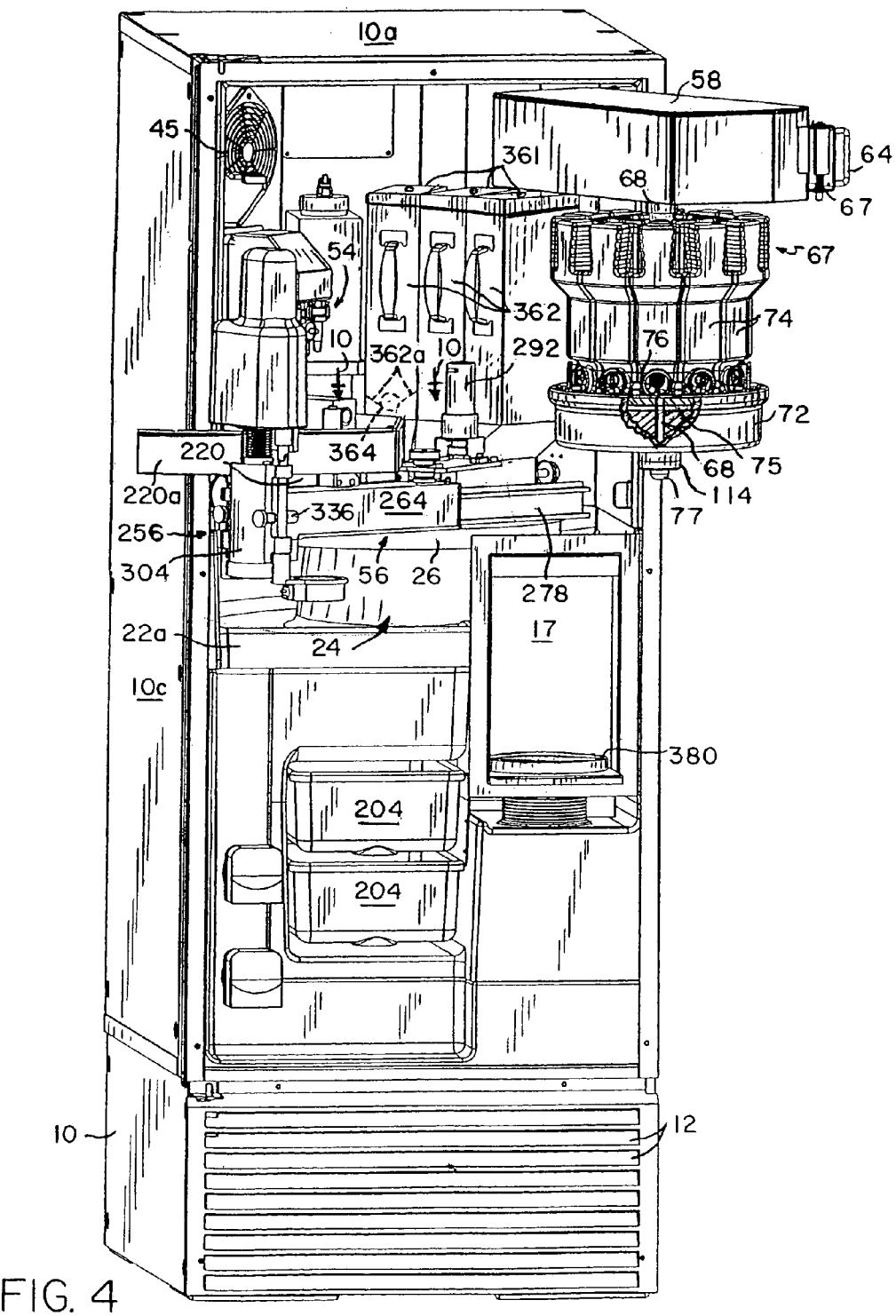
FIG. 4 is a similar view of the apparatus showing both the turret section and delivery sections (sans cover) in their open positions.

Referring to FIGS. 3 to 5, preferably an electric blower 45 is mounted inside cabinet 10 in the corner between the cabinet walls 10a and 10c. In the illustrated apparatus, the blower sucks in relatively warm air at the top of the cabinet and delivers it via a duct 46 to a secondary cooling unit or system 47 at the bottom of cabinet 10. Unit 47, under the control of controller 38, expels cold air which cools the cabinet 10 interior and especially the space under shelf 22 containing the supplies of the product base to be described later. If a more uniform temperature within the cabinet is desired for a particular application, the air flow path through duct 46 may be reversed so that cold air is discharged at the top of the cabinet. Thus, the apparatus contains two distinct and separately controlled cooling systems 44 and 47, the former of which cools freezing surface 26 and the latter of which cools the interior cabinet 10.

As best seen in FIGS. 2 and 5, the apparatus includes a turret section shown generally at 52 which provides a plurality of different flavors. Positioned next to the turret section 52 is a product base delivery means indicated generally at 54 which, upon command, can deliver a selected one of a plurality of product bases, aerated or not, to the turret section where it is mixed with a selected flavor from turret section 52. The turret section thoroughly mixes and aerates (or not) the flavored product base and deposits same on the upper surface 26a of freezing surface 26. Disposed between turret section 52 and the freezing surface 26 is a product delivery section shown generally at 56. The delivery section 56 includes means for spreading the flavored mix on the surface 26a so that it forms a layer of selected area and thickness which becomes frozen or partially frozen. Delivery section 56 also includes means for scraping the frozen or partially frozen product from freezing surface 26, compacting the product into a "scoop" and delivering that scoop to the dispensing station 17 from where it may be removed by the consumer through the portal 16 in cabinet door 14 (FIG. 1).

It is apparent that the rotation of freezing surface 26 with respect to the fixed delivery section 56 provide the necessary relative motion to facilitate the distribution and collection of the food product on that surface. Obviously the same effort could be accomplished with a stationary freezing surface 26 and a rotary delivery section 56. In each case, the speed of rotation affects the dwell time of the products on the surface 26. That, in turn, affects the speed and degree of freezing and therefore the texture and mouth feel of the resulting product.

The Turret Section 52

Referring to FIGS. 2 and 3, the turret section 52 is specifically designed to minimize parts and to maintain sanitary pathways for the fluids being deposited on the freezing surface 26. It is illustrated as a swing-out unit, but could just as well be implemented as a pull-out drawer. In any event, the illustrated section includes a horizontal gate 58 which is connected by a hinge 62 to the cabinet's sidewall 10b. Gate 58 may be swung between a closed, operative position within cabinet 10 illustrated in FIG. 2 and an open position shown in FIG. 3 wherein the turret gate is swung out to provide access to the components of the turret section for resupply and maintenance purposes. A handle 64 is present at the free end of gate 58 to facilitate swinging the gate between those two positions, and a latch 66 and keeper 66a are provided to latch the gate in its closed position shown in FIG. 2.

Suspended from gate 58 is a turret shown generally at 67 comprising a shaft 68 whose upper end is rotatably supported within gate 58 and which extends down to a lower end 68a which, when the turret section 52 is in its closed position, is situated in a clearance notch 69 (FIG. 3) formed in the delivery section 56. Shaft 68 is rotated by a servomotor 70 (FIG. 6C) mounted in gate 58 under the control of controller 38. A portion of that motor extending below the gate may be enclosed by a cover 71. Mounted and rotatably fixed to shaft 68 is a circular plate 75 (FIG. 4) which supports a multiplicity, herein twelve, of wedge-shaped bottles or containers 74 held in position by spacers 76 projecting up from that plate. Thus, the flavor positions are directly related to the home position of the shaft 68 as detected by a home sensor (not shown).

Removably mounted to the lower end of shaft 68 under plate 75 is a circular manifold 72 having a relatively thick side wall which extends up around that plate. A pin (not shown) projecting up from the upper surface of the manifold engages in a hole on plate 75 to rotatably fix the manifold to the plate and thus to shaft 68. The manifold is held in place against the plate by a nut 77 threaded onto the lower end of the shaft.

Figure 6A:
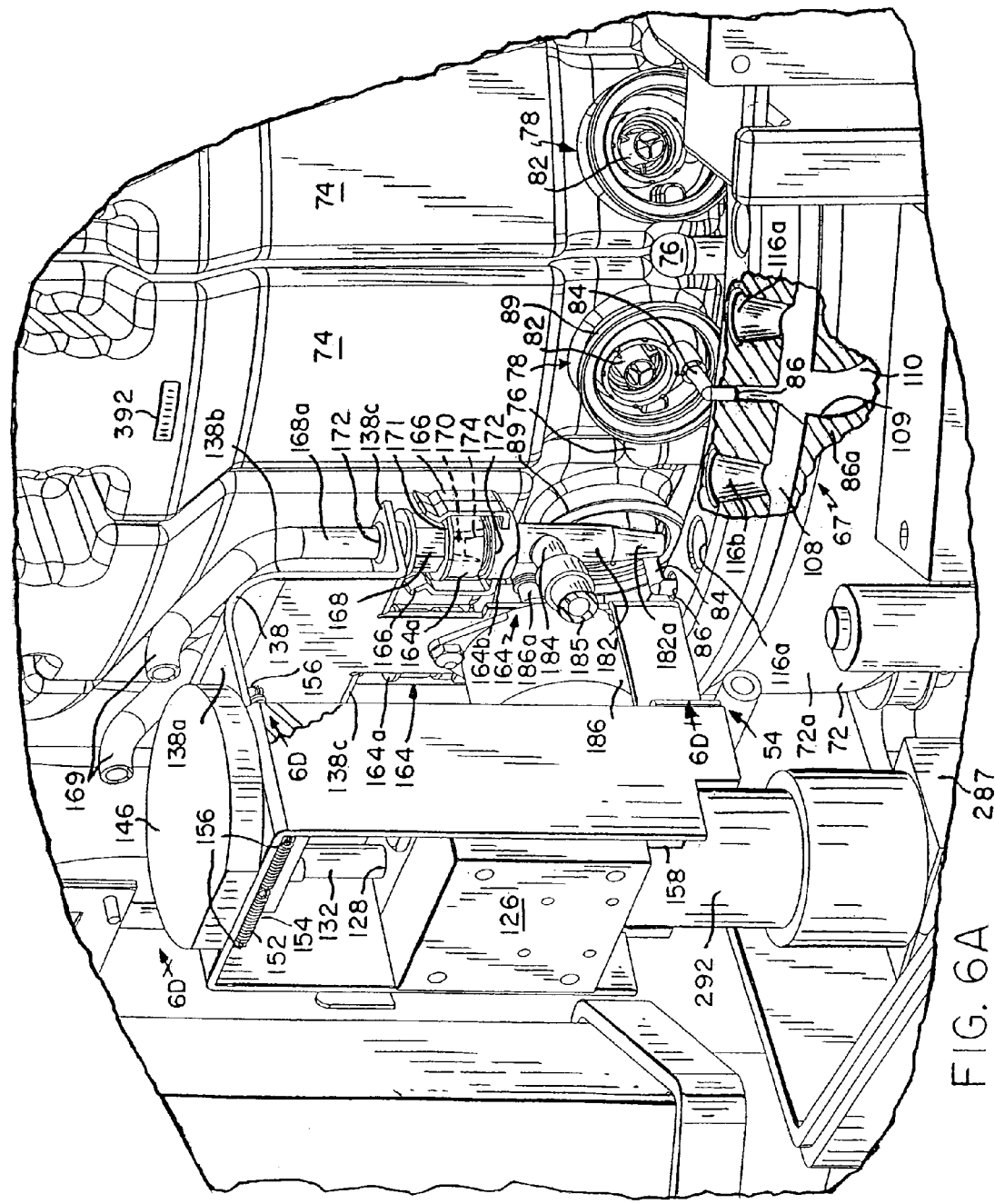
FIG. 6A is a fragmentary perspective view on a larger scale showing part of the turret section of the FIG. 1 apparatus in greater detail.
Figure 6B:
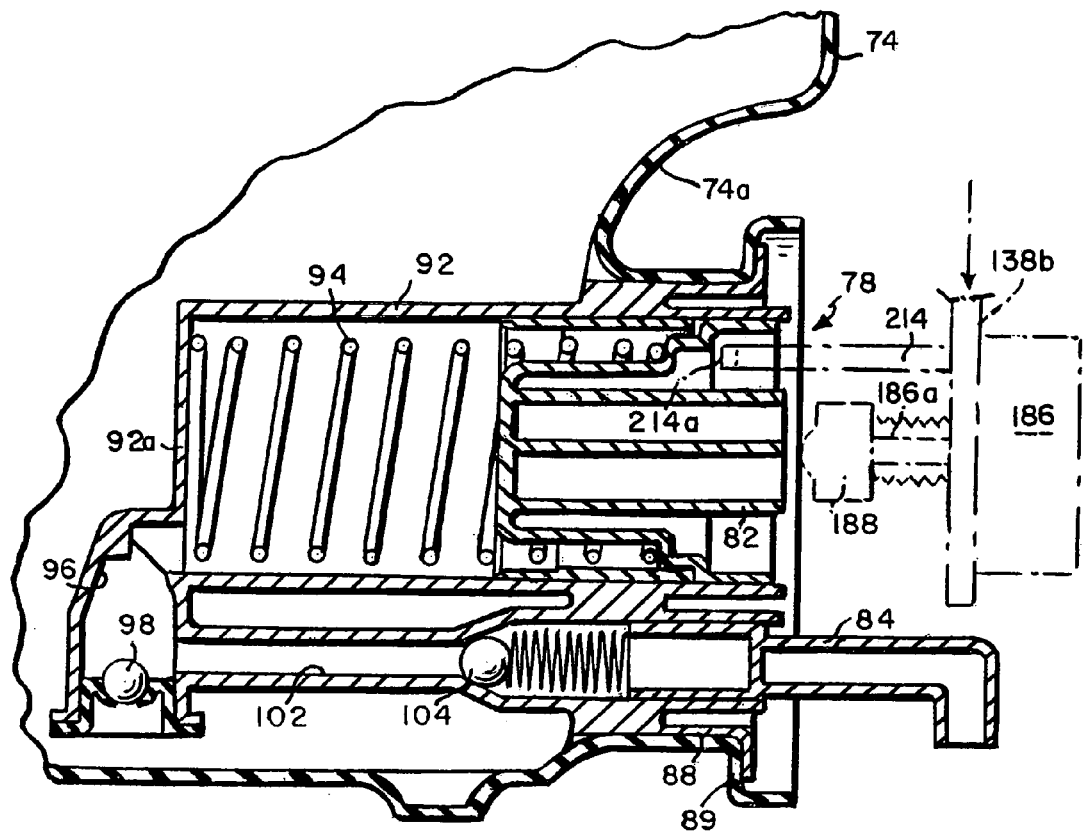
FIG. 6B is a sectional view on a larger scale showing in detail a flavor bottle pump in the FIG. 6A turret section.

As seen from FIGS. 6A and 6B, each bottle 74 has a radially outwardly facing pumping section 78 including a radially moveable piston 82. When a piston 82 is depressed or moved inward toward shaft 68, the liquid in the corresponding bottle 74 is pumped out through an outlet conduit 84 which extends down into a top opening 86 in the side wall 72a of manifold 72. To eliminate the need for cleaning pump parts, the pumping section 78 may be permanently attached to bottle 74 which may itself be disposable.

As shown in FIG. 6B, the pumping section 78 is installed in an opening 88 in the front wall 74a of bottle 74 adjacent to the bottom thereof. For reasons to be described later, the mouth of that opening is surrounded by a radial flange 89. The pumping section includes a generally cylindrical housing 92 which slidably receives the piston 82. The piston is movable between an outer position shown in FIG. 6B and an inner position closer to the closed inner end 92a of the housing. The piston is biased to its outer position by a coil spring 94 compressed between the piston 82 and the housing end 92a.

Pumping section 78 also includes an antechamber 96 in fluid communication with the interior of the housing 92 at the closed end 92a thereof. Antechamber 96 opens into the interior of the corresponding bottle 74 and is fitted with a check valve 98 so that when piston 82 is moved to its extended or outer position shown in FIG. 6B, liquid in bottle 74 is drawn into antechamber 96 and into housing 92. Also in fluid communication with antechamber 96 is a fluid passage 102 which is connected by way of a check value 104 to the outlet conduit 84. When the piston 82 is moved to its inner or retracted position, the liquid in antechamber 96 and the housing 92 interior is expelled through passage 102 and check value 104 to the outlet conduit 84, section 78 also including provision for venting the bottle.

In order to maintain optimum product quality, each bottle 74 is preferably used only once; i.e. it is a disposable item. It may be filled initially through an opening 105 (FIG. 6C) near or at the top of the bottle which opening is then sealed to prevent reuse of the bottle.

Figure 6C:
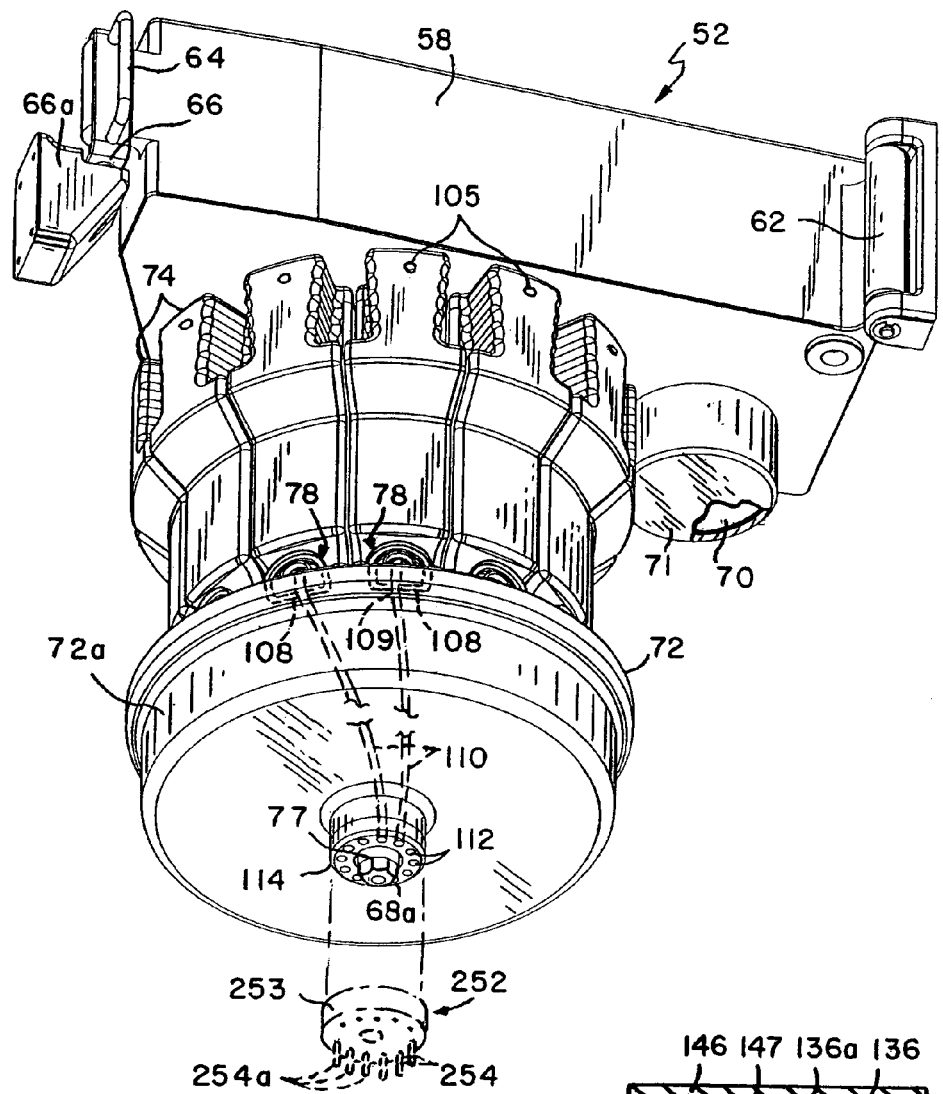
FIG. 6C is a fragmentary perspective view showing the underside of the turret section.

As best seen in FIGS. 6A and 6C, the outer end of each outlet conduit 84 is turned down and makes a sliding seal with the side wall 86a of the opening 86 into which it extends. Each opening 86 leads to a separate mixing chamber 108 having an outlet 109 which connects to a separate turbulence tube or passage 110 leading to a separate outlet port 112 in a depositing head 114 at the underside of manifold 72. In other words, outlet conduit 84 from each bottle 74 connects to a different mixing chamber 108 whose outlet is connected by a different turbulence tube 110 to a different port 112 in head 114. The provision of a separate fluid path to head 114 for each flavor minimizes carryover from one product serving to the next. Ports 112 form a circular array in the depositing head 114 that is located above the freezing table 26 when turret section 52 is in its closed position shown in FIG. 2. The structure and function of the turbulence tubes 110 are described in detail in the aforesaid patents incorporated by reference.

For reasons that will become apparent, each mixing chamber 108 has two additional inlet branches extending to top openings 116a and 116b in manifold wall 72a on opposite sides of the corresponding opening 86 therein. In other words, in the illustrated apparatus with twelve flavor bottles 74, manifold 72 defines twelve mixing chambers 108 connected to twelve long, sinuous turbulence tubes 110 leading to twelve outlet ports 112 in head 114. Typically, the tubes or passages 110 are in the order of 2 to 4 feet long, a preferred length being about 3 feet. Preferably, the manifold is molded (using the lost wax process) or otherwise formed as a generally cylindrical block containing the aforesaid mixing chambers 108 and conduits 110.

Manifold 72 is preferably removable from shaft 68 as noted above in order to facilitate its cleaning. For this, a special cup-like attachment connected to a supply of water and detergent at a sink may be engaged to the depositing head 114 in order to backflush all of the manifold passages 110.

The Product Base Delivery Means 54

Figure 6D:
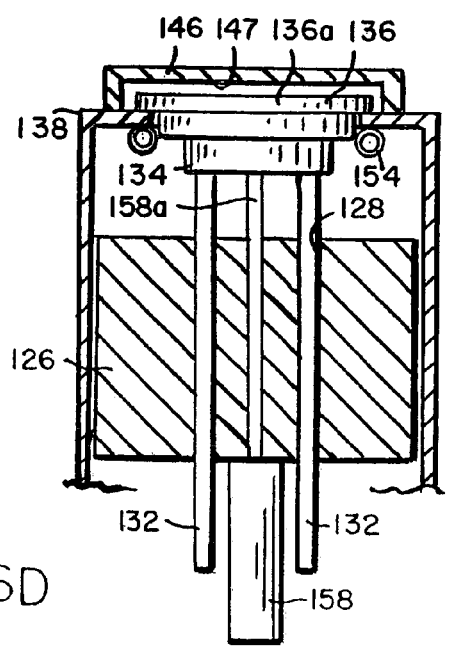
FIG. 6D is a sectional view on a larger scale taken along line 6D—6D of FIG. 6A.

Referring now to FIGS. 3, 6A and 6D, delivery means 54 operates in concert with manifold 72 to make and break connections of the tubing supplying the product bases to the manifold so as to deliver product bases to the manifold via a minimum number of tubing joints or splits. The delivery means 54 included a block 126 mounted to the side wall 10c of cabinet 10. Formed in block 126 is a pair of laterally spaced-apart vertical passages 128 for slidably receiving a pair of guide rods 132. The upper ends of rods 132 are secured to a block 134 anchored by suitable fasteners to the bottom of a circular disk 136 having a top flange 136a.

Delivery means 54 also includes a relatively large bracket or shuttle 138 having a horizontal arm 138a and a vertical arm 138b. Arm 138a is provided with a large opening 142 for receiving disk 136 with some clearance but whose edge underlies disk flange 136a. The bracket arm 138a is fastened to an overlying plate 146. Plate 146 and bracket arm 138a form a pocket 147 for disk 136 which, for reasons that will become apparent, permits some movement of plate 146 relative to disk 136 but only in a horizontal plane. In other words, there is a small gap between the edge disk flange 136a and the side wall of pocket 147. To center the plate 146 relative to disk 136, a set of eight springs 154 is provided, the springs being stretched between four posts 156 extending down from bracket arm 138a at locations that define the four corners of a square and four outboard posts located midway along each side of that square. As shown in FIG. 6D, the springs 154 underlie the opening 142 in the bracket arm 138a and engage the sides of disk 136. Thus, the springs tend to maintain plate 146 centered on disk 136, but allow some horizontal movement of the plate.

Referring to FIGS. 6A and 6D, a vertical, double-acting pneumatic actuator 158 is mounted to block 126 between openings 128 therein. Actuator 158 has a shaft 158a which connects to block 134. Actuator 158 is normally charged with air through one inlet so that its shaft 158a is extended so as to maintain bracket or shuttle 138 in a raised position relative to turret section 52 as shown in FIG. 6A. When air is delivered to the other actuator inlet and the one inlet is vented under the control of controller 38 (FIG. 5), the bracket or shuttle 138 is moved downward relative to the turret section as will be described in detail later.

The vertical bracket arm 138b has two tabs 138c which are bent toward turret section 52 such that the tabs overlie the side wall 72a of manifold 72. The tabs 138c support a pair of mirror-image nozzle assemblies each shown generally at 164. Each nozzle assembly includes an upper section 164a mounted to a tab 138c and a lower section 164b which is releasably secured to the upper section by clips 166. As we shall see, section 164b is part of a disposable product base supply unit.

The upper nozzle section 164a includes a fitting 168 which has a neck 168a extending up through a hole 172 in the associated tab 138c and is secured to that tab. Each fitting neck 168a is connected via a hose 169 to a supply of compressed air as will be described presently. Fitting 168 has an internal passage 170 which is upwardly-inwardly tapered. Also the fitting has an external shoulder 171.

The lower nozzle section 164b includes a fitting 172 having a tapered tubular upper end or nose 174 adapted to plug into passage 170 of fitting 168 to establish a fluid-tight face seal therewith. Of course, other comparable seals are possible including an O-ring, gland seal, etc. Clips 166 extend up from fitting 172 and are arranged to engage the shoulder 171 to releasably couple together the two fittings 168, 172. The lower nozzle section also has a vertical leg 182, and a side branch 184 which opens into leg 182. Side branch 184 is connected to tubing 185 leading to a source of liquid product base which is part of the disposable product base supply unit mentioned above.

Referring to FIGS. 6A and 6B, for reasons to be described, delivery means 54 also include an actuator 186 mounted to bracket arm 138b between that bracket arm and block 126. The actuator 186 has a shaft 186a which extends through the bracket arm and is terminated by a plunger 188 (FIGS. 3 and 6B) which faces turret section 52 between the two nozzle assemblies 164.

As shown in FIGS. 5 and 6A, the two air hoses 169 are connected to outlets from a compressed air tank 194 which is pressurized by an air compressor 196. When outlet valves (not shown) in the lines from the tank 194 are opened under the control of controller 138, air at a selected pressure is delivered to nozzle assemblies 164.

Each nozzle assembly 164 also receives a liquid product base. More particularly as shown in FIGS. 2 and 5, cabinet 10 has a rack 197 which supports a plurality, herein two, of trays 204. Each tray contains a sealed flexible bag 206 containing a liquid product base. Each bag is part of a disposable base product supply unit mentioned above, which unit may be similar to the one described in the above-mentioned U.S. Pat. No. 5,727,713. For example, the bag 206 in one tray 204 may contain a yogurt base while the bag in the other tray may be filled with an ice cream base or simply water or a water mix to make a slush. Each bag is connected to one of the tubes 185 leading to a nozzle section 164b (FIG. 6A). Each tube 185 extends out of the associated tray 204 and is passed through a roller pump 210 on its way to one of the nozzle assemblies 164. When each roller pump 210 is activated under the control of controller 38, that pump and its associated tube 185 function as a peristaltic pump to pump liquid product base from the corresponding bag 206 to the corresponding nozzle assembly 164. Preferably, each pump 210 is driven by a DC servo with feedback control so that the pump pumps at a selected rate for a selected period to assure precise portion control over the dispensed product base.

When compressed air and the product base are provided simultaneously to each nozzle assembly 164, the two fluids mix within the nozzle assembly and that fluid mixture is discharged through the nozzle discharge end 182a of that assembly. If the product to be dispensed is not aerated, e.g. a slush, compressed air is not delivered to the operative nozzle assembly during the dispensing cycle. As we shall see presently, the product base is combined in chamber 108 within the manifold 72 with a selected flavor from one of the bottles 74 in the turret 67. Preferably, each nozzle assembly 164 incorporates one or more check valves (not shown) to isolate the lines leading from the base supply and the air supply. Most preferably, a check valve is located in the fitting 172 of each lower nozzle assembly section 164b.

Referring to FIG. 6A, the relative position of turret 67 and product base delivery means 54 is such that when the turret 67 is rotated to position one of bottles 74 directly opposite delivery means 54 as described above, the nozzle assemblies 164 of the delivery means are disposed directly above the pair of passages 116a and 116b in the manifold side wall 72a that bracket the opening 86 in that wall which receives the outlet tube 84 from that opposing bottle. Also, the actuator plunger 188 (FIGS. 3 and 6B) of the delivery means 54 is located directly above the pump piston 82 of that same bottle 74. Thus, when the delivery means actuator 158 is actuated by controller 38 (FIG. 5) to shift bracket or shuttle 138 to its aforesaid lower position, the tapered discharge ends 182a of nozzle assemblies 164 are plugged into the underlying openings 116a and 116b in the manifold wall 72a making seals with the side walls of those openings. As noted previously, the shuttle 138 is movable in the vertical direction and maintains the nozzle assembly 164 in a vertical orientation. But to accommodate misalignment of the nozzle assembly 164 and turret, the shuttle 158 is compliant in the horizontal plane. Thus, the nozzle ends 182a shift as necessary to establish good seals with the walls of openings 116a, 116b. Of course, other comparable flexure arrangements may be contemplated to provide the necessary relative movement between the nozzles with manifold to establish good seals between the two.

At this point, the actuator plunger 188 is now positioned directly opposite the piston 82 of that bottle's pumping section 78 as shown in phantom in FIG. 6B. Thus, if controller 38 should activate the base product mix pump 210 serving one of the nozzle assemblies 164 while initiating the delivery of compressed air to that same nozzle assembly, the nozzle assembly will deliver a selected volume of air and product base to the operative mixing chamber 108 in manifold 72. If the controller should also activate actuator 186, the actuator plunger 188 will extend against the piston 82 of the operative bottle 74 causing a selected amount of flavor to be pumped via outlet tube 84 to the same mixing chamber 108. To assure that a precise portion of flavor is dispensed with each actuation of the plunger 188, a pair of grippers 214 with in-turned ends 214a may project from the front of the bracket or shuttle leg 138b as shown in FIG. 6B. When the shuttle 138 is in its raised position shown in FIG. 6A, the grippers extend out over the bottle flange 89. But when the shuttle is in its lower position shown in FIG. 6B, the gripper ends 214a engage behind the bottle flange at the opposite sides thereof thereby holding the bottle while the plunger 188 presses against the pump piston 82 thus eliminating any compliances inherent in the shuttle and turret system. The same effect may be obtained by engaging a depending pin on the shuttle in a hole in the manifold or vice versa.

All three fluids will come together in the chamber 108 and will be thoroughly mixed and aerated (if selected) in the turbulence tube 110 extending from that chamber to the depositing head 114 so that by the time the fluid mixture reaches the corresponding outlet port 112 in that head 114 and is deposited on the freezing surface 26, the flavor will be distributed uniformly throughout the mix and the mix may have a selected amount of aeration or overrun.

Often only one nozzle assembly 164 is active at any given time, However, in some cases, it may be desirable to also deliver air to the "inactive" assembly which plugs into the manifold opening 116a, 116b adjacent to the one receiving the selected product base so that the base fluid will not cross over in mixing chamber 108 and come out that adjacent opening. Variations on the turret and nozzle assemblies may include various check valve implementations to organize and control flow through the flow paths of both liquids and the air.

The Delivery Section 56

Referring to FIGS. 2 to 4, delivery section 56 is also designed as a swing-out unit for easy cleaning and maintenance, although it could just as well be a pull-out drawer. In another device embodiment, the turret section 52 and delivery section 54 may be formed as a single unit that is separable from freezing surface 26. In any event, the illustrated section 56 preferably comprises a pan-like shelf 220 which has a side wall 220a and is connected by a hinge 222 to the interior surface of the cabinet sidewall 10c so that the shelf can be swung between a closed, operative position shown in FIGS. 2 and 3 wherein the shelf is interposed between the freezing surface 26 and the manifold 72, and an open position shown in FIG. 4 wherein the shelf is swung out to provide access to the components of the delivery section for cleaning and maintenance. The shelf 220 may be maintained in its closed position by a suitable latch 224 shown in FIGS. 2, 4 and 8B. The shelf 220 has a circular cutout 226 formed in its forward edge that defines the notch 69 which provides clearance for the shaft lower end 68a of the turret 67 when both the turret and the delivery sections are in their closed positions shown in FIG. 2.

Figure 7:
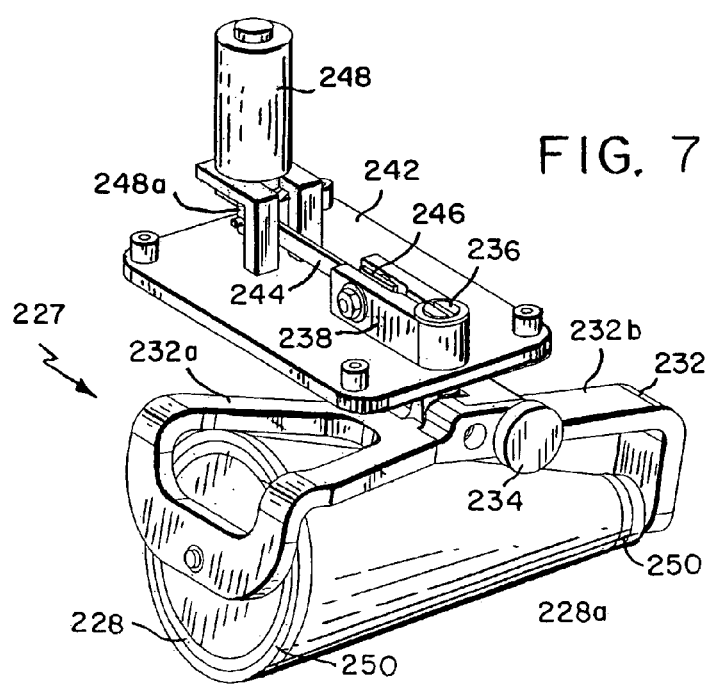
FIG. 7 is an enlarged perspective view showing the leveling roller in the delivery section of the FIG. 1 apparatus.

Suspended from the underside of shelf 220 is a roller assembly shown generally at 227 in FIGS. 2 and 5. As best seen in FIG. 7, assembly 227 comprises a conical leveling roller 228 rotatably supported at its opposite ends by a bracket 232. Bracket 232 is actually composed of two separate sections 232a and 232b which are releasably connected together by a thumbscrew 234. By removing the thumbscrew, the two sections can be spread apart allowing the roller 228 to be separated from bracket 232 in the event it becomes necessary to clean or replace the roller.

A slotted post 236 extends up from bracket 232 and is slidably received in a vertical promontory 238 formed in a plate 242 that is normally mounted to the underside of shelf 220. Promontory 238 is also slotted to provide clearance for one end of a lever arm 244 so that that end of the lever arm can be pivotably connected to the upper end of post 236. Lever arm 244 is itself pivotally connected at 246 to promontory 238 so that when the opposite end of the lever arm is moved up and down, the bracket 232 and roller 228 are moved up and down relative to plate 242. Note that the engagement of lever arm 244 in the slotted promontory 238 fixes the angular position of post 236 so that roller 228 is orientated radially with respect to the rotary axis of table 26. To produce the rocking motion of the lever arm, an actuator 248 is mounted to plate 242 with the shaft 248a of the actuator being pivotally connected to the end of lever arm 244 remote from post 236. The pivot 246 for lever arm 244 is created from a combination of parts that allows for vertical adjustment of the pivot point to compensate for parts tolerances and to permit adjustment of the actuator stroke. Alternatively, a fixed throw solenoid could act directly on post 236.

The roller 228 is comprised of a rigid internal core covered by an elastomeric sheath. At each end of the sheath is a circular ridge 250. When plate 242 is mounted to the underside of shelf 220 as shown in FIG. 2, the roller surface 228a is spaced a selected small distance above the freezing surface, e.g. 0.020 inch, by ridges 250, which set the gap for the thickness of product on freezing surface 26. That thickness affects the freezing rate of the liquid mix deposited on surface 26 which has an impact on freezing characteristics, ice crystal formation, etc., which, in turn, can affect the texture and mouth feel of the final product. On the other hand, when actuator 248 is actuated under the control of the controller 38 (FIG. 5), a compressive force is transferred to roller 228 through lever arm 244. This force compresses the elastomeric ridges 250 allowing the conical roller surface 228a to contact the freezing surface 26 so that product residue on the roller offsets to surface 26. As will be seen later, this is done periodically to clean the surface of the roller to minimize carryover from one serving to the next.

As we shall see also, when the depositing head 114 of turret section 52 deposits liquid product mix on freezing surface 26, preferably at a location at about one-half the radius thereof, as that surface rotates, roller 228 spreads out that deposit on upper surface 26a to the level determined by the height of ridges 250, i.e. 0.020 in. Thereupon, the leveled product mix becomes frozen or partially frozen due to the low temperature of the freezing surface 26.

In a preferred embodiment of the invention, the depositing head 114 of manifold 72 may be provided with an attachment 252 which may be secured to head 114 by nut 77. The attachment, shown in FIG. 6C, includes a cup-like base 253 supporting a plurality of depending flexible tubes 254. The upper ends of the tubes are arranged to connect to the outlet ports 112 in head 114 while the lower ends, which are closed, extend down next to roller 228. The tubes 254 have side openings 254a directed toward roller 228. Resultantly, when liquid mix flows out of ports 112, it is directed by tubes 254 against the conical surface 228a of roller 228. This avoids splatter that could occur if the liquid is deposited directly onto (i.e., normal to) surface 26a. Such splatter could make it more difficult to maintain the desired minimum level of carryover and ease of cleaning.

In some applications, other means may be employed besides a roller to level and control the thickness of the liquid deposit on surface 26. For example, a radially oriented leveling blade may be used which is normally maintained at a selected elevation (gap) above surface and which may be periodically brought into contact with that surface momentary in order to clean the blade edge.

Figure 8A:
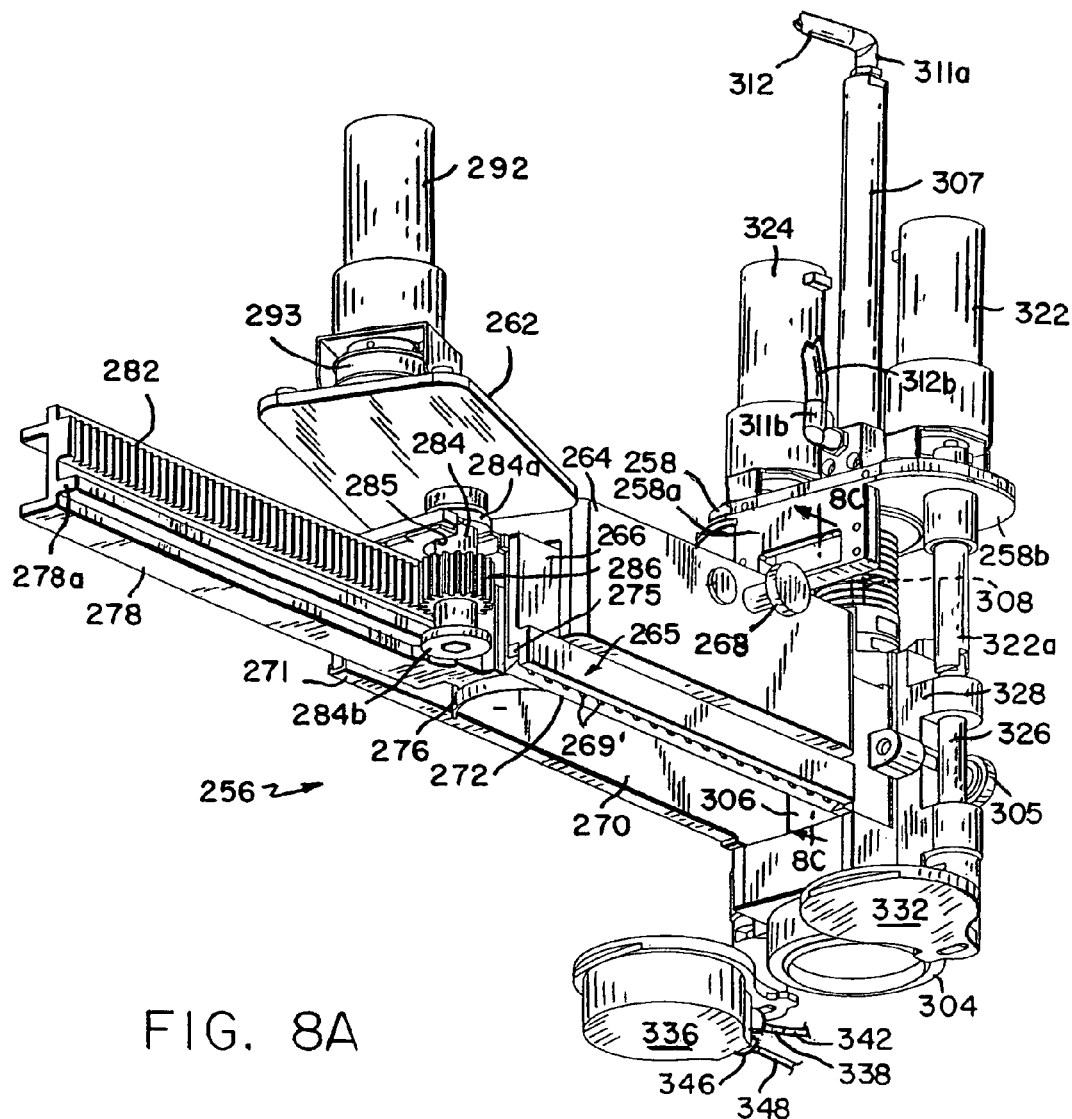
FIG. 8A is a perspective view from below illustrating the compaction/forming assembly in the delivery section of the FIG. 1 apparatus.

Referring to FIGS. 2 and 8A, the delivery section 56 also includes a compaction assembly shown generally at 256 mounted to shelf 220 so that, when section 56 is in its closed position shown in FIG. 2, assembly 256 is oriented radially with respect to the rotary axis of freezing surface 26. As best seen in FIGS. 8A to 8C, assembly 256 includes a corner bracket 258 at the outer end of the assembly which has a vertical leg 258a that is normally secured to the side wall 220a of shelf 220 as in FIG. 2. At the inner end of the assembly is a support plate 262 which is normally mounted to the underside of shelf 220. Also, normally secured to the underside of that shelf between bracket 258 and plate 262 is a bracket 264 having a generally L-shaped cross-section. That bracket pivotally supports a scraper assembly shown generally at 265.

As best seen in FIG. 8C, assembly 265 comprises an inverted U-shaped channel 266. An eye 266a projecting up from the top wall of the channel receives a horizontal pin 267 extending to bracket 264 and is retained by a thumb screw 268 extending through a hole in that bracket and into the threaded end of that pin. That pin/eye connection prevents vertical and horizontal movement of the channel but allows limited pivotal motion thereof so that the scrapper assembly will contact the freezing surface 26 all along its length as will be described presently despite possible height variations in that rotating surface.

Snugly received in channel 266 is an inverted U-shaped liner 269 having a front wall or blade 269a, a rear wall 269b and a top wall 269c. The lower edge margin 271 of the rear wall 269b is crimped around the adjacent edge of channel 266 to secure the liner to the channel. The liner front wall or blade 269a extends below the rear edge margin 271 and its lower edge is beveled to form a sharp scraping edge 272.

Just above edge 272, the liner front wall is thickened to form a forwardly extending shelf 273. Further as shown in FIG. 8C, the channel 266 is internally notched at 274 just above shelf 273 to provide a space for receiving an elastomeric strip 275 which extends the length of channel 266. A gap G is provided between liner top wall 269c and the top wall of channel 266 so that the liner front wall 269a and its scraping edge 272 can move vertically relative to the channel with the resilient strip 275 providing compliance. Thus the strip 275 functions as a spring to urge edge 272 toward freezing surface 26. A series of small tabs or feet 269' project to the same plane as the scraping edge 272 of the channel 266 front wall. These feet ride along freezing surface 26 just behind scraping edge 272 to add stability to the scraper assembly 265.

Referring to FIGS. 8A and 8B, for reasons that will become apparent, the liner 269 defines a radial alley or path 270 for pushing means in the form of a scraper blade 276. The blade 276 is curved about a vertical axis and its side edges resiliently but slidably engage the liner side walls 269a, 269b. Blade 276 is secured to one end of a rigid beam 278 having a toothed rack 282 is formed in the side of beam 278 facing liner front wall 269a. Also, a depending shaft 284 is rotatably mounted in the support plate 262 directly opposite rack 282. The shaft 284 is slidably received in a notch 285 adjacent to the inner end of channel 266. An enlargement 284a of shaft 284 seats on the top of channel 266 and the shaft carries a spur gear 286 whose teeth mesh with those of the rack. Also on shaft 284 below gear 286 is a radial enlargement 284b which rotatably engages under a lateral rib 278a of beam 278 to help support the beam. When the shaft 284 is rotated in one direction or the other, the scraper blade 276 is moved back and forth in a horizontal direction along path 270 in liner 269.

Shaft 284 is rotated by a reversible motor 292 mounted to the top of plate 262, the motor shaft being connected via a speed reducer 293 to the upper end of the shaft. Motor 292 is operated under the control of controller 38 (FIG. 5) to move the scraper blade 276 from a retracted position shown in FIG. 8A wherein the blade 276 is located at the inner end of liner 269 under plate 262 to an extended position wherein the blade is positioned at the outer end of the liner under bracket 258.

As best seen in FIGS. 2 and 5, when the compaction assembly 256 is properly mounted to the shelf 220, the channel 266 extends radially out from the rotary axis of the freezing surface 26 such that the horizontal leg 258b of bracket 258 extends out laterally beyond the shelf side wall 220a over the dispensing station 17. In this position of the assembly 256, the scraping edge 272 resiliently engages the upper surface 26a of the freezing surface 26 along a radius of that surface which lags behind roller 228 by about 270°.

It will be obvious from the foregoing that after the liquid product mix has been leveled by roller 228 and frozen on the rotating freezing surface 26, the frozen product will encounter the scraping edge 272 lagging 270° behind the roller. The scraping edge will scrape the frozen product from the surface 26a and gather it into a ridge row of frozen product extending along path 270 in liner 269. If motor 292 is now activated, scraper blade 276 will be moved radially along path 270 to its extended position at the edge of shelf 220 thereby pushing that ridge row to the edge of shelf 220 and into a forming cylinder to be described shortly.

Figure 8D:
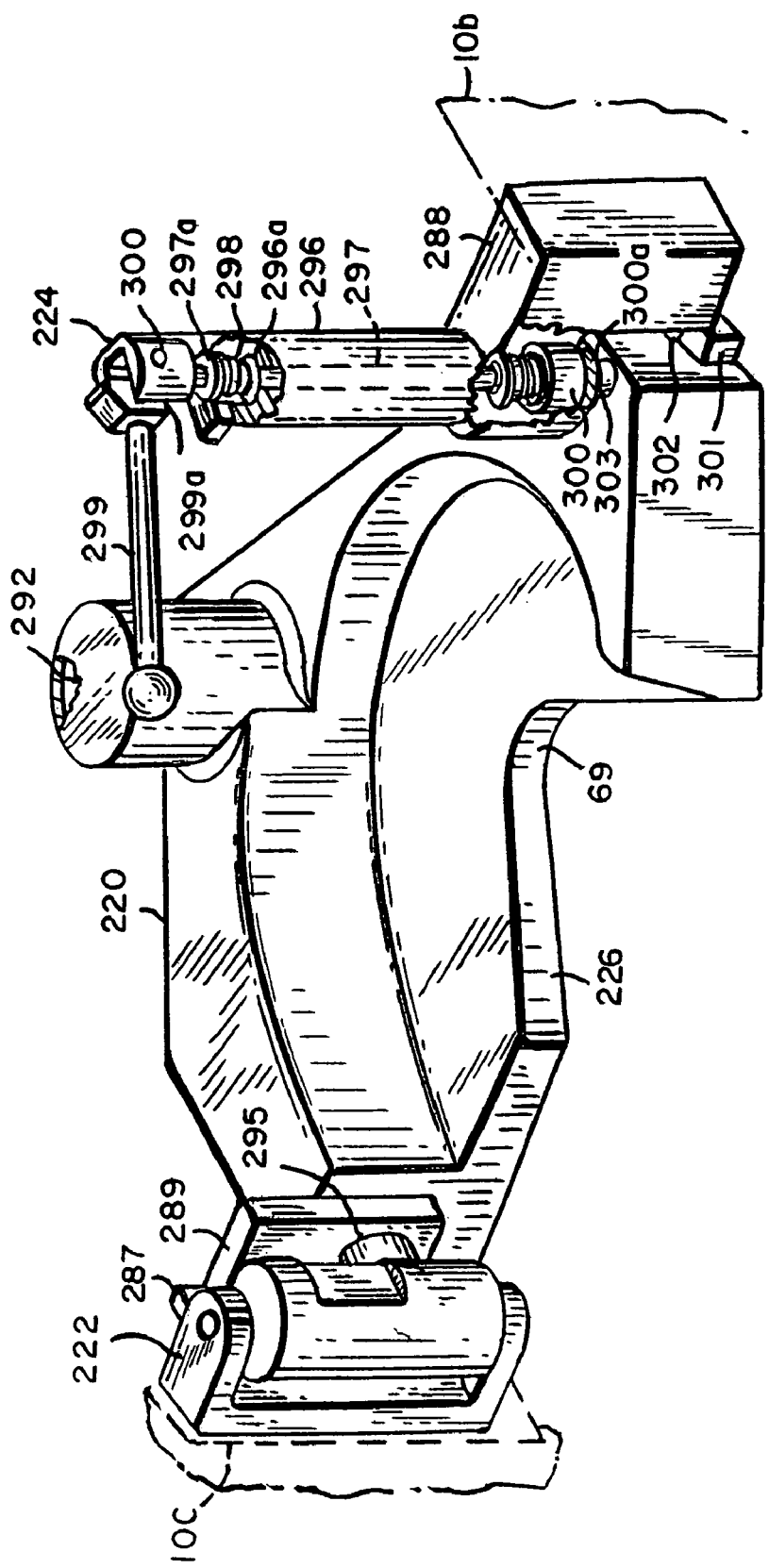
FIG. 8D is a fragmentary perspective view showing another portion of the delivery section in greater detail.

As best seen in FIGS. 3 and 8D, the shelf 220 is connected to cabinet wall 10c by a hinge 222. Shelf 220 is attached to hinge 222 by way of a torsion bar 295 which extends perpendicular to hinge 222 and has one end connected to the hinge and the other end secured to shelf 220. The torsion bar 295 permits the shelf to rotate counterclockwise (FIG. 8D) relative to hinge 222 from a stable position that orients scraper assembly 265 at some small angle of about 1° above the horizontal. This allows shelf 220 to swing between its closed operative position shown in FIG. 2 to its open position shown in FIG. 4 without the scraper assembly 265 rubbing against the freezing surface 26. A stop 287 on the hinge 222 is engaged by a vertical plate 289 connected to shelf 220 to prevent over travel of shelf 220 in the counter clockwise direction in FIG. 8D.

After shelf 220 has been swung to its closed position shown in FIG. 4, the latch 224, which is mounted to cabinet side wall 10b, is moved to its latched position. More particularly, the latch includes a base 288 normally secured to wall 10b. The base supports an upstanding tubular housing 296. Housing 296 slidably receives a vertical shaft 297 having a flange 297a adjacent to its upper end. Compressed between the flange 297a and a shoulder 296a of the housing is a coil spring 298 which biases the shaft 297 upwards in housing 296. A lever arm 299 is connected by a pivot 300 to the top of housing 296. The lever arm is formed with a depending cam 299a so that when the lever arm 299 is moved downward, the cam engages the top of shaft 297 and the shaft is shifted downward. Mounted to the lower end of shaft 297 is a lost motion plunger 300 with an overhang 300a which extends over the shelf. When shelf 220 is moved to its closed position, a cam 301 at the edge of shelf engages under a cam follower 302 projecting out from base 295. Resultantly, when lever 299 is swung down, shaft 297 is moved down thereby pushing plunger 300 into a hole 303 in the top of shelf 220. Also, the shelf itself is pushed downward by the plunger against the upward bias provided by the torsion bar 295 until the scraper edge 272 engages against freezing surface 26. The lost motion plunger 300 provides compliance in the event that upper surface 26a of freezing surface is not flat. The fact that the scraper assembly 265 is mounted to shelf 220 by pin 267 enables that assembly to remain parallel with upper surface 26a and produce a uniform loading of the freezing surface 26.

Of course in lieu of the lever-actuated shaft 297, other comparable means may be used to lock the shelf in its closed position automatically, e.g. a pneumatic cylinder or solenoid actuator controlled by controller 38 (FIG. 5).

Referring now to FIGS. 2 8A 8B and 8E, the compaction assembly 256 also includes a vertical forming cylinder 304 which is secured to the radially outer end of channel 266 by fasteners 305. A lower end of cylinder 304 is open. In addition, the side wall of the cylinder facing the outer end of the liner has a window 306 which is sized so that when the scraper blade 276 is moved to its extended position pushing the ridge row of frozen product into the cylinder in the process, the blade eventually closes window 306 thus essentially becoming part of the forming cylinder side wall.

Figure 8E:
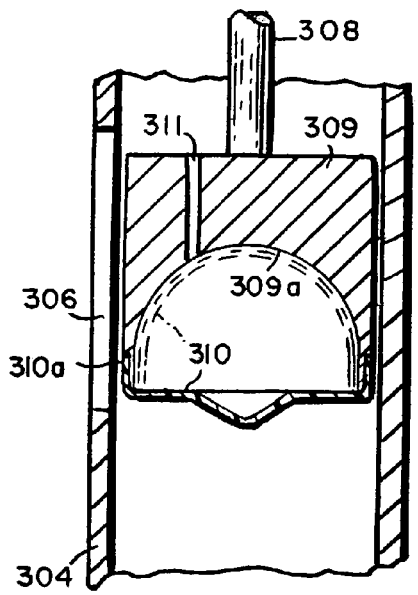
FIG. 8E is a fragmentary sectional view, on a larger scale, showing a part of the FIG. 8A assembly in greater detail.

Mounted to the bracket leg 258b directly above cylinder 302 is a vertical, double-acting pneumatic cylinder 307 containing a piston 308. Mounted to the lower end of the piston rod is a downwardly facing hemispherical ejection cup 309 whose diameter is slightly less than the inside diameter of forming cylinder 304 so that the cup can slide up and down within the cylinder along with the piston 308. As best seen in FIG. 8E, cup 309 has a concave lower surface 309a whose mouth is spanned by an elastic diaphragm 310 which is specially shaped so that when cup 309 pushes frozen product down in cylinder 304, diaphragm 310 is deformed by product into the cup as shown by dashed lines in that figure so that the thus compacted product assumes a dome or, scoop or other molded shape depending upon the shape of surface 309a. A suitable vent passage 311 is provided in cup 308 to vent the space above the diaphragm 310. When cup 309 reaches the end of its downward movement, the resilience of diaphragm 310 will cause the dials phragm to reassume its natural shape shown in solid lines in FIG. 8C. In so relaxing, the diaphragm actually peels away from the ice cream thereby releasing the ice cream "scoop" from cup 309 allowing it to drop into a container placed under cup 309.

In an alternative arrangement, the diaphragm may have a normal shape shown by the dashed lines in FIG. 8E and be forced downward or outward by compressed air introduced through passage 311 to eject the product scoop.

In either event, the diaphragm 310 is preferably provided with a reinforced edge margin 310a which functions both as a sliding seal and a wiper to clean the interior surface of cylinder 304 as the cup 309 moves up and down within the cylinder.

Air ports 311a and 311b are provided at the respective upper and lower ends of cylinder 307. The ports are connected by valved air hoses 312a and 312b, respectively, to the compressed air tank 194 shown in FIG. 5. When air is supplied to port 311a and vented from port 311b, the piston 308 and cup 309 attached thereto move downward within cylinder 304. On the other hand, when air is supplied to port 311b and vented through port 311a, the piston and cup move upwardly within the cylinder.

Still referring to FIG. 8A, also mounted to the bracket leg 258b on opposite sides of cylinder 307 may be a pair of rotary actuators 322 and 324. Preferably, cylinder 307 as well as actuators 322, 324 are normally housed in a protective boot 325 as shown in FIG. 2. The shaft 322a of actuator 322 extends down through the bracket leg 258b and its lower end is releasably keyed to the upper end of a vertical shaft 326 rotatably mounted to a bracket 328 extending from one side of cylinder 304 and which is, in turn, secured by the fasteners 305 to the adjacent end of the channel 266. Shaft 326 extends down to a point just below the lower end of cylinder 304 and the lower end of that shaft is connected to a discoid door 332 having essentially the same diameter as that of cylinder 304. Door 332 can be swung by actuator 322 under the control of controller 38 (FIG. 5) between an open position shown in FIG. 8B wherein the door is located to one side of cylinder 304 and a closed position wherein the door completely closes the bottom opening into the cylinder while the cylinder is being loaded with frozen product by scraper blade 276 as described above. It should be understood, however, that in some applications, the door 332 may not be necessary.

Figure 9:
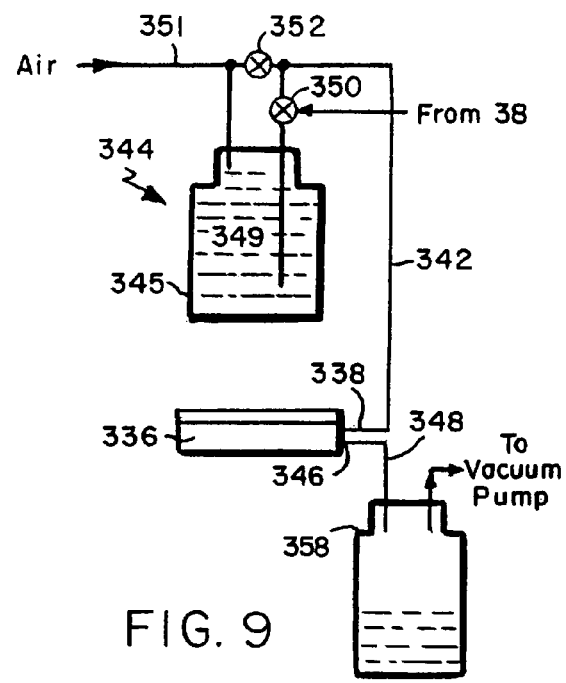
FIG. 9 is a diagrammatic view of another part of the delivery section.

As best seen in FIGS. 8A, 8B and 9, the other rotary actuator 324 operates in a similar manner to swing a cleaning cup 336 located at the opposite side of cylinder 304 from door 332 between an open position shown in FIGS. 8A and 8B wherein the cup is swung to one side of the cylinder and a closed position wherein the cup is disposed directly under the lower end of the cylinder. As we shall see, cup 336 is used to periodically clean the interior of cylinder 304 and the ejection cup 309 therein. To this end, an inlet port 338 is provided in a wall of cleaning cup 336 and that port is connected by tubing 342 to a clean water misting source shown generally at 344 mounted to the rear wall of cabinet 10 behind the product base delivery means 54 as seen in FIG. 3. Cup 336 also includes an outlet port 342 connected by tubing 348 to a vacuum waste container 358 mounted to the cabinet side wall 10b behind dispensing station 17 as shown in FIG. 5.

Referring to FIG. 9, the misting source 344 comprises a relatively large bottle 345 containing a supply of water or other cleaning fluid. Cleaning fluid from the bottle is pumped from the bottle via a tube 349 containing an automatic pinch valve 350 controlled by controller 38 and fed via tube 342 to inlet 338. Pumping air from tank 194 (FIG. 5) is delivered to the bottle via tube 351. A manually set needle valve 352 controls the air/fluid ratio delivered to tube 342 and cup 336.

At the appropriate time in the operating cycle of the apparatus, cleaning cup 336 may be moved into position under forming cylinder 304. The aforesaid pinch valve 350 is opened by controller 38 and mist is ejected from a nozzle 336a in the cup (FIG. 8B) and directed up into forming cylinder 304 to clean any residue from the prior product serving from the interior surface of the cylinder, the diaphragm 310 and other product contact points thereby minimizing carryover to the next serving. The pinch valve 350 then closes allowing just air to be blown via tube 342 and nozzle 336a into the forming cylinder 304 to dry the components in preparation for the next product serving. The waste fluid is then conveyed from the cup 336 via the outlet tube 348 to the waste container 358 shown in FIG. 5. Preferably, means (not shown) are provided for drawing a vacuum in container 358 so that the waste fluid is actually sucked from cup 336 to the waste container. Of course, cleaning of the cylinder may be done at other times in the dispensing cycle under the control of controller 38 (FIG. 5).

Figure 10:
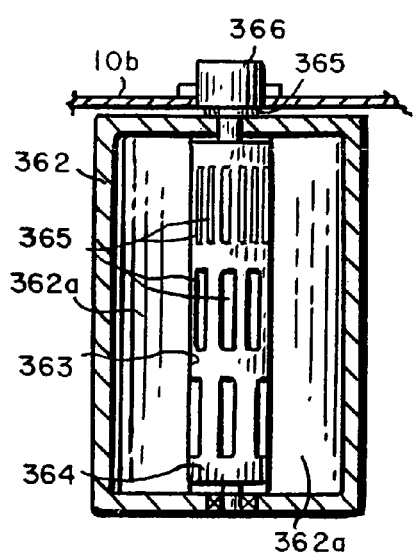
FIG. 10 is a sectional view on a larger scale taken along line 10—10 of FIG. 4.

Referring now to FIGS. 4 and 10, preferably provision is made for depositing mix-ins such as jimmies, crushed nuts and the like on the base product mix spread out on the freezing surface 26. Although such depositing means are not strictly part of the delivery section of the apparatus, they are closely related thereto and accordingly will be introduced at this point. The depositing means comprise a plurality of bins 362 removably mounted to the cabinet sidewall 10b and the cabinet rear wall behind the closed turret section 52. The bins have open tops to facilitate filling the bins with different mix-ins. Preferably, covers 361 normally close the top openings into bins 362 to protect the bins contents. Each bin has a downwardly inclined or V-shaped bottom wall 362a leading to a slot 363 which extends out over freezing surface 26. Filling that slot is a roller 364 rotatably mounted at the bottom of the bin with a gear 365 projecting from the end of the bin. When the bin is in place, gear 365 meshes with a similar gear (not shown) driven by a motor 366 mounted to wall 10b. Each roller is formed with a plurality of grooves 365 so that when the roller is rotated by motor 366 under the control of controller 38, mix-in particles will be carried around by the grooved roller and sprinkled onto the spread out and leveled product on the freezing surface 26. Thus, while the selection of a particular mix-in is controlled by the consumer by depressing a particular button on control panel 18 (FIG. 1), the controller 38 controls the timing and amount of the mix-in deposit on surface 26.

The Product Dispensing Station 17

Referring now to FIGS. 1, 2 and 5, the components of dispensing station 17 are supported by a shelf 370 located at the front of cabinet 10 adjacent to the cabinet side wall 10b.

The dispensing station includes a plate 372 mounted to shelf 370 and which supports a vertical, double-acting pneumatic cylinder 374 which contains a piston 376 (FIG. 5). Cylinder 374 has the usual inlet/outlet ports at its upper/lower ends and these ports are connected by three tubes 378a, 378b and 378c to the compressed air tank 194 shown in FIG. 5, suitable valves being provided in the air lines to control the air flow to and from cylinder 374. Attached to the upper end of piston 376 within station 17 is a lift plate 380 which moves up and down with the piston and removably mounted to the lift plate is a tray 381. The tray is adapted to support a product container C such as a cup or cone. If the latter, the tray is shaped to hold the cone vertically. Preferably three guide rods 382 extend down from lift plate 380 through suitable openings in support plate 372 around cylinder 374 to stabilize the tray during its up and down movements. Also, a bellows or boot 384 may be connected between support plate 372 and lift plate 380 to protectively enclose the sliding piston.

Cylinder 374 operates under the control of controller 38 to move tray 380 at least between a lower retracted position shown in FIGS. 1 and 5 wherein tray 380 and its contents are readily accessible through the dispensing portal 16 in the closed cabinet door 14 and an upper extended position illustrated in FIG. 2 wherein the cup or cone supported on the tray is disposed directly under the open lower end of the forming cylinder 304 in position to receive the frozen compacted product pushed out of the cylinder by the ejection cup 309. In addition, the controller 38 is preferably programmed to set the tray 380 at one or more intermediate positions to allow for servings with more than one scoop of frozen product, e.g. a double decker cone.

Rotary Coupling 24

Figure 12A:
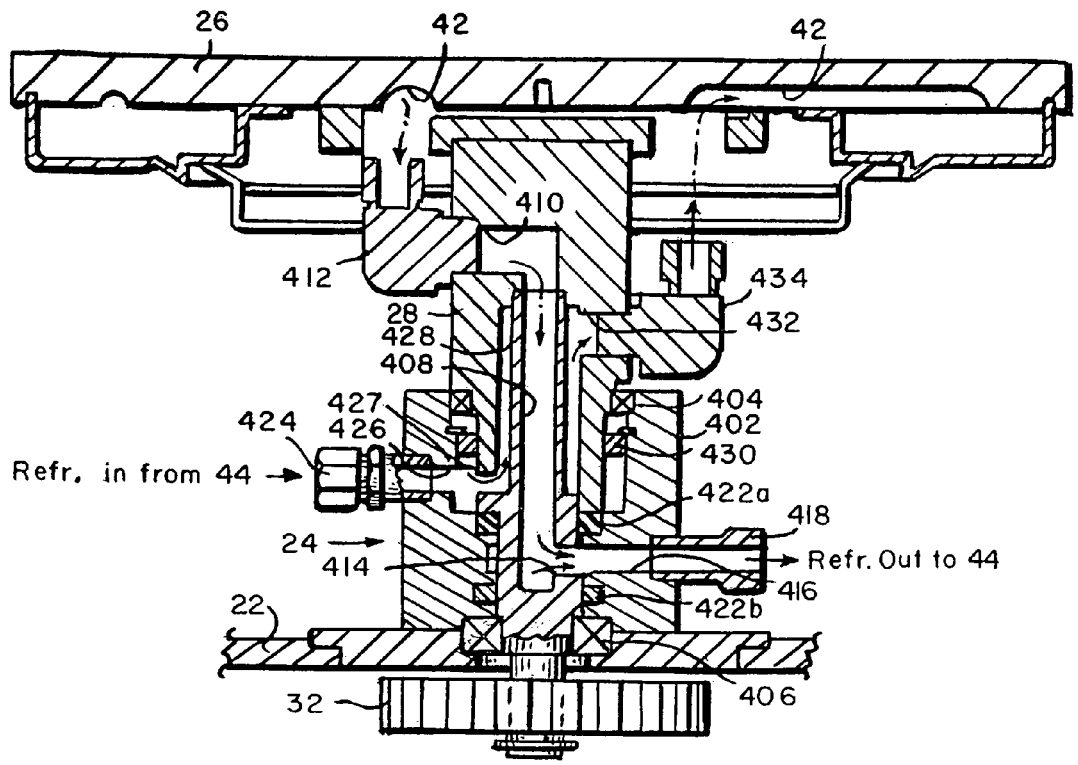
FIG. 12A is a sectional view on a larger scale of the rotary coupling/seal assembly for the rotary freezing surface in the FIG. 1 apparatus.

Referring now to FIGS. 5 and 12A, as described above, the freezing surface 26 has a depending shaft 28 which is rotated by a driven pulley 32. Surface 26 contains a fluid path 42 whose opposite ends are connected by rotary coupling 24 to fluid lines leading to and from refrigeration system 44. Coupling 24 includes a cylindrical housing 402 which is mounted to shelf 22 and which receives the shaft 28. As shown there, both the shaft and the housing 402 are stepped to accommodate an upper bearing element 404 at the top of housing 402 and a larger lower bearing element 406 at the bottom of the housing. The shaft 28 extends below the lower bearing element 406 where it is connected to the pulley 32.

As shown in FIG. 12A, shaft 28 has an axial passage 408 whose upper end communicates with a radial passage 410 which leads to an elbow fitting 412 connected to one end of the fluid path 42 in freezing surface 26. A side passage 414 is provided adjacent to the opposite end of passage 408 which communicates with a radial passage 416 in housing 402 whose outer end is provided with a fitting 418 for conducting refrigerant to the refrigeration system 44. Rotary seals 422a and 422b are provided between shaft 28 and housing 402 above and below passages 414 and 416 to provide fluid tight seals at those locations.

Refrigerant fluid from refrigeration system 44 is introduced into coupling 24 by way of a fitting 424 in the side of housing 402. Fitting 424 communicates with a radial passage 426 in the side of housing 402 which leads through a radial hole 427 in the shaft 28 to an annular passage 428 which surrounds passage 408. A rotary seal 430 is provided between passage 426 and bearing element 404 which, along with the seal 422a, confines the inflowing refrigerant to those fluid pathways.

The refrigerant flowing into the annular passage 428 leaves that passage via a side hole 432 near the upper end of shaft 28. That hole 432 leads to an elbow fitting 434 which is connected to the other end of the fluid path 42 in the freezing surface 26.

The fluid flow through the coupling 24, shaft 28 and freezing surface 26 is indicated by the arrows in FIG. 12A. Thus, the coupling 24 along with shaft 28 conduct refrigerant through the freezing surface 26 so that that surface can function as the evaporator component of the refrigeration system 44 as described above, while still allowing that surface to be rotated at the desired speed.

Figure 12B:
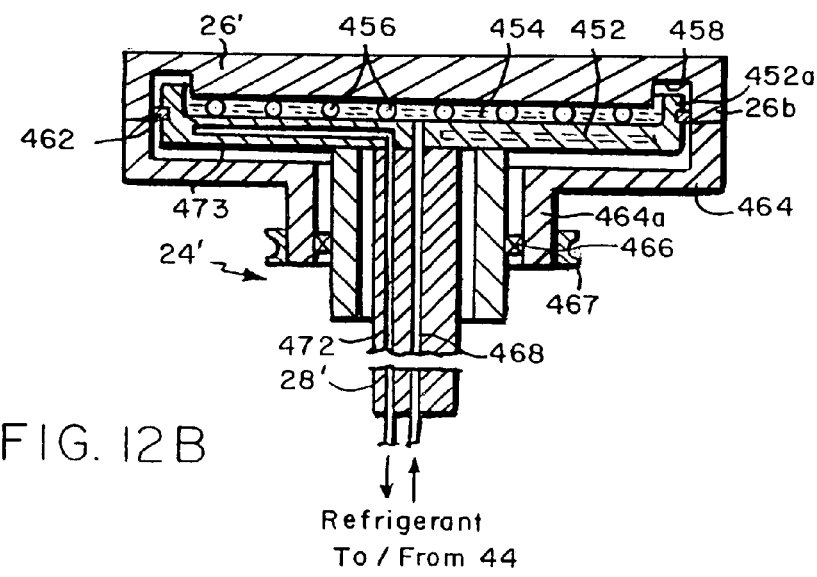
FIG. 12B is a similar view on a much smaller scale of another such assembly embodiment.

FIG. 12B illustrates another rotary seal embodiment shown generally at 24'. In this embodiment, a stationary shaft 28' supports a discoid table 452 mounted to the upper end of the shaft. Table 452 has a raised lip or rim 452a enabling table 452 to contain a viscous, thermally conductive liquid 454 such as propylene glycol. Also supported on table 452 in that liquid 454 is a multiplicity of ball bearings 456.

In this embodiment, the freezing surface 26' is positioned on top of table 452 so that the underside of the freezing surface rests on the ball bearings 456. A circular recess 458 is provided in the underside of surface 26' which provides clearance for the upper edge of the rim or lip 452a that establishes the liquid 454 level, and surface 26' is formed with a depending flange 26b' which encircles table 452. To enable surface 26' to rotate relative to table 452, a rotary seal 462 is provided between rim 452a and flange 26b'. Also, a skirt 464 is secured to the lower edge of flange 26b' which skirt has a reduced diameter neck 464a which surrounds shaft 28'. Preferably a bearing element 466 is provided between skirt 464a and shaft 28' to allow the skirt along with freezing surface 26' to rotate to relative to table 452. The lower end of the skirt neck 464a is formed as a pulley 467 which may be rotated by a conventional belt drive (not shown).

A pair of longitudinal passages 468 and 472 are provided in shaft 28' and table 452 for conducting refrigerant through a long spiral or sinuous passage 473 in plate 452. As the refrigerant from refrigeration system 44 is circulated through plate 452, heat is transferred by conduction and convection through the liquid 454 to maintain the freezing surface 26' at the desired low temperature, while at the same time allowing that surface to be rotated by pulley 467.

Operation of the Apparatus

As mentioned above, all of the various fluid lines are provided with appropriate valves which operate under the control of controller 38 to deliver the various fluids at the correct times and in the correct amounts to achieve accurate product portion control. Likewise all of the various electrical components of the apparatus are activated by the controller in a selected sequence during each product dispensing cycle to dispense at the dispensing station 17 a controlled portion of the particular flavored product selected by the operator at the apparatus' control panel 18. The apparatus is also provided with conventional position sensors and interlocks for safety reasons and to prevent its various sub-systems from operating out of sequence and to signal when a particular function is not performed. For example, the door 16a to dispensing station 17 is locked when the machine is in a dispensing cycle. Also, the machine will not commence a dispensing cycle unless a container C is on tray 380.

In the case of the motor-activated parts, i.e. scraper 276, door 332 and cleaning cup 336, special provisions are made for detecting when those parts are not performing their intended functions at the correct times in the apparatus operating sequence. More particularly, the drive circuit for each motor 292, 322 and 324, respectively, includes a voltage controller to set the motor speed so that the time it takes for a part such door 332 to move between stops at its open and closed positions is known, e.g. 5 seconds. The current drawn by the associated motor, i.e. motor 322, is monitored by controller 38 to detect when a current spike occurs when the part reaches a stop thereby stopping the motor shaft. If the spike occurs at the known elapsed time, i.e. 5 seconds, then the controller "knows" that the door 332 has fully closed (or opened). On the other hand, if the spike occurs at, say, 3 seconds or 7 seconds, the controller "knows" that the door is only particularly closed (or opened) and thereupon stops the dispensing cycle.

When the apparatus is in its initial state, the refrigeration system 44 is operative so that the upper surface 26a of freezing surface 26 has the desired low temperature, e.g. 0° F. Also, surface 26 is usually already rotating although provision may be made for stopping rotation at a selected time after the previous dispensing cycle. Also initially, the tray 380 is in its lower position, the roller 228 is in its raised position, the cylinder door 332 (if present) is closed, cleaning cup 336 is swung to the side and the scraper blade 276 is retracted to its position shown in FIG. 8A.

A customer or operator makes a product selection by placing the appropriate container C on tray 380 and depressing the required buttons in control panel 18, perhaps after depositing money. More specifically, he/she may select among the available product bases, e.g., ice cream or yogurt, and among the available flavors, e.g., vanilla, chocolate, etc. Available also is a selection of mix-ins, e.g., jimmies, crushed nuts, etc.

The selections are stored in the memory of controller 38 which then carries out the steps required to deliver the selected frozen product to the dispensing station 17 as follows:

delivers compressed air to the lowest port 378c of cylinder 274 and vents the upper port 378a to raise tray 380 to its upper position shown in FIG. 2 or by delivering air to port 378b, to a lower raised position if the customer has selected a serving with more than one scoop;

activates the motor 70 to position the bottle 74 containing the selected flavor opposite the product base delivery means 54;

activates actuator 158 to plug nozzles 164 into passages 116a and 116b in the manifold 72;

opens the compressed air hose 169 and activates pump 210 of the line to the nozzle assembly 164 that delivers a controlled portion of the selected base product mix, while activating actuator 186 to pump flavor from the operative bottle 74 so that a controlled amount or portion of aerated flavored product mix is deposited by the depositing head 114 onto the freezing surface 26;

turns off the delivery of said fluids to the operative nozzle assembly 164 and retracts the nozzle assemblies from manifold 72;

possibly activates the roller motor 366 of a selected one of the mix-in bins 362 if a mix-in has been selected;

at this point, the liquid deposited on the rotating freezing surface 26 is leveled automatically by roller 228 and becomes frozen or partially frozen before it is scraped from the freezing surface by scraper assembly 265 and collected into a ridge row of frozen product that extends in a line along path or alley 270 between the scraper blade 276 and the window 306 of forming cylinder 304;

activates motor 292 to extend the scraper blade 276 which pushes the row of frozen product through window 306 into forming cylinder 304 so that the product compacts against the closed door 332 (if present) thereby forming a solid cylindrical body of frozen product within cylinder 304;

delivers compressed air to the lower port of cylinder 307 while venting the upper port to retract ejection cup 309 slightly and then activates actuator 322 to open the forming cylinder door 332 (if present);

activates actuator 248 to press roller 228 against the freezing surface 26 with enough force to compress the roller's elastomeric ridges 250 so that the roller's conical surface 228a contacts the freezing surface; the roller is held in this position for a time that allows enough rotations of the roller, e.g. two, to cause offsetting of any product residue on the roller to the freezing surface 26 thereby cleaning the roller, with the offset product being scraped up by blades 269a and 276 and included in the present serving, thereby minimizing product carryover from one serving to the next; alternatively, controller 38 may be programmed to clean the roller before the next depositing step so that any roller residue offset to the freezing surface is included in the next serving; of course, the residue can also be scraped manually or automatically into a waste container (not shown) under the edge of surface 26;

delivers compressed air to the upper port 310a of pneumatic cylinder 310 while venting the lower port to extend ejection cup 309 and perhaps also delivers compressed air to cup 309 to push out its diaphragm 310, thereby releasing the compacted frozen product portion out the bottom of cylinder 304 into container C;

delivers compressed air to the upper port 378a of cylinder 374 while venting at least one of the lower ports to lower tray 380 thereby allowing removal of the product-filled container C from tray 380 through the portal 16 in the cabinet door 14;

activates rotary actuator 324 to rotate cleaning cup 336 under the forming cylinder 304;

opens valve 350 of the misting source 344 to deliver cleaning mist via cleaning cup 336 to the interior of forming cylinder 304 and actuates the vacuum pump serving the waste container 358 to collect waste liquid from the cleaning cup;

possibly activates cylinder 307 to raise and lower the ejection cup 309 within cylinder 304 to ensure thorough cleaning of the cup and the interior wall of the cylinder by sliding seals 310a;

closes pinch valve 350 of the misting source 344 to deliver just air to cleaning cup 336 to air dry the interior of cylinder 304;

activates cylinder 307 to raise ejection cup 309;

actuates motor 292 in reverse to retract the scraper blade 276 thereby completing the dispensing cycle.

If desired, the cleaning cup 336 may be left in the closed position of the dispensing cycle so that at the beginning of the next cycle, the apparatus may execute a pre-cleaning of cylinder 304 after which the cup 336 may be moved to its open position and be replaced by door 332 (if present).

It is contemplated that an end-of-day cleaning cycle be carried out by substituting for product base bags 206, similar bags containing a cleaning solution and cycling the apparatus to rotate turret 67, using nozzle assemblies 164, and to pump cleaning solution, in turn, to each pair of manifold openings 116a, 116b so as to flush out and sanitize all of the flow paths 110 in manifold 72, including extension tubes 254.

The controller 38 controls and manages all of the functions and activities of the apparatus, including the timing thereof, necessary to make, and to maintain strict portion control of, all products being dispensed by the apparatus and to assure prompt and effective delivery of those products, as well as to maintain the machine in a sanitary and properly refrigerated condition. The controller may also be programmed to carry out various housekeeping and inventory control functions. To facilitate this, the flavor bottles 74, bags 206 of product base and mix-in bins 362 may be marked with coded indicia, e.g., bar codes, which identify and pertain specifically to the particular substance in the bottle, bag or bin. One such bar code 392 is illustrated on a bottle 74 in FIG. 6A. To read the coded indicia, the apparatus may include a code scanner or reader 294 shown in FIG. 1 which may be plugged into a receptacle 296 in the cabinet door 14 above display 19 and connected to controller 38. Alternatively, the scanner or reader may be plugged into a receptacle inside the cabinet. When resupplying the apparatus, the coded indicia 292 on the bottles, bags and bins may be read out by scanner or reader 294 and loaded into the internal memory of controller 38. The controller preferably also stores therein other data for controlling the operation of the apparatus depending upon the ingredients being mixed to form the finished product.

Thus, the controller may store data reflecting the amount of a selected flavor that should be mixed with a particular product base to obtain an optimum food product. For example, less chocolate flavor may be required to make a serving of chocolate ice cream as compared with chocolate yogurt; less flavor may be needed to make chocolate ice cream as compared with strawberry ice cream, etc. Thus, controller 38 is programmed to mix the proper amount of the ingredients available in the apparatus at a given time as reflected by the container codes 392 written into the memory of controller 38, to cause the apparatus to dispense products with superior qualities. In other words, in a sense, the product ingredients and the processing thereof are optimized to suit the apparatus and its control functions. Resultantly, when a customer selects a particular product at control panel 18 (FIG. 1), the apparatus will dispense a selected product with the proper ratio of ingredients for that particular product.

Other examples of the type of control exercised by the controller depending upon the ingredients being mixed include optimum residence time on surface 26, optimum surface 26 temperature.

Likewise, the amount of mix-in dispensed for a given serving may vary depending upon the types of mix-ins contained in bins 362. Controller 38 is programmed to control each dispenser motor 366 to dispense the proper amount of the particular mix-in selected by the customer which may vary depending upon the particular product base selected by the customer.

Preferably also stored in the controller memory is the number of servings that can be delivered from each bottle, bag and bin and the time when that particular container was last replaced. Thus, the controller can keep track of the amount of material remaining in each such container and thus can update product availability information being displayed by display 19 and trigger an alarm or an appropriate display message on the display 19 to signal that it is time to refill or replace empty or near empty containers or containers whose contents may be outdated.

Of course controller 38 can be programmed to cause display 19 to show other information such as "flavor of the month" product discounts, special sales and the like.

Other Options

As alluded to above, certain sections of the above-described apparatus may have separate utility. For example, the turret section 52 and delivery means 54 may operated to dispense selected beverages, e.g., soft drinks, from head 114 into a container position under that head. For this, the tubing 185 leading to each nozzle assembly may be connected to a source of water or carbonated water. Another option as to fill the bottles 74 with various liquid soup, coffee, tea, chocolate, etc. bases which, when combined with hot water from nozzle assemblies 164, will result in a selected heated product being delivered to a container positioned under head 114. Even a powder, e.g., chocolate, coffee, soup base, etc. may be delivered along with the air as a slurry via hoses 169 to nozzle assemblies 164 and combined therein with a liquid such as milk, water, etc. from tubing 185 to dispense at head 114 a hot or cold beverage or other liquid food product.

Also, surface 26 may be made hot instead of cold by circulating a hot fluid through passage 42 (FIG. 5) therein or by incorporating a heating element in that surface. If, then, an egg base is delivered to nozzle assemblies 164 and mixed therein with milk delivered via hoses 169 and deposited on the hot surface 26, the resultant product may be an omelet, pancake, candy, cookie, etc. depending upon the particular product base. Various liquid toppings, e.g. tomato sauce, fudge sauce, maple syrup, etc. from bottles 74 may be added to the resultant product after the product has set on surface 26, and various add-ons such as cheese, diced peppers, onions, coconut, etc. from bins 362 may be sprinkled by rollers 364 on the top of the set product resident on the hot surface 26.

Also, it should be understood that various alternate surface 26 configurations may be more appropriate to make certain products. For example, to cool or partially freeze a beverage or a strip of candy, it may be more efficient to design surface 26 as a vertically oriented rotary chilled funnel with the liquid from head 114 being deposited on the upper end of the interior surface of the funnel and the cold or frozen product being delivered to a container under the funnel.

Still further, the set or solidified product on surface 26, be it ice cream, an omelette, cookie, etc. may be removed from that surface manually using a spatula or scraper instead of relying on delivery section 56 for that purpose.

Also, the basic concept of controlling various aspects of the making and dispensing of a product from a plurality of ingredients, including mixing ratios, process times, ingredient, replacement times, etc., based on coded information corresponding to the replacement time and type of the ingredients, has other obvious application aside from food dispensing.

It will thus be seen that the objects set forth above among those made apparent from the preceding description are efficiently attained. Also, certain changes may be made in carrying out the above method and in the above constructions without departing from the scope of the invention. Therefore, it is intended that all matter contained in the above description or shown in the accompanying drawings shall be interpreted as illustrative and not in a limiting sense.

It is also to be understood that the following claims are intended to cover all of the generic and specific features of the invention described herein.

What is claimed is:

1. A method of dispensing a food product comprising the steps of providing a substantially horizontal surface having a central axis and a periphery;

positioning over said surface depositing means which deposit a selected amount of liquid product mix onto the surface while rotating the depositing means and surface relatively about said axis so that the liquid product mix spreads out on the surface and sets to form an at least partially solidified product layer;

scraping the layer from said surface as scrapings;

pushing said scrapings away from said axis to a selected location on said surface adjacent to said periphery so as to consolidate said scrapings thereat, and removing the consolidated scrapings from said selected location as said food product.

2. The method defined in claim 1 including the step of cooling said surface to a temperature low enough to at least partially freeze said liquid product mix to form said product layer.

3. The method defined in claim 2 including the additional step of selecting an ice cream or yogurt mix for deposit by the depositing means.

4. The method defined in claim 1 including the additional step of controlling the residence time of the liquid product mix on said surface depending upon the composition of said liquid product mix.

5. The method defined in claim 1 including the additional steps of monitoring the temperature of said surface, and controlling the temperature of said surface depending upon the composition of said liquid product mix.

6. The method defined in claim 1 wherein the removal step includes compacting the consolidated scrapings beyond said periphery into a selectively-shaped body of food product.

7. The method defined in claim 6 including the additional step of depositing said body into a container.

8. A method of dispensing a food product composed of a plurality of ingredients which are mixed to form the food product, said method comprising the steps of providing a rotary surface having a substantially vertical rotary axis and a periphery;

mixing together a liquid ingredient and a fluid ingredient to form a liquid product mix;

depositing the liquid product mix onto said surface while rotating said surface about said axis so that the liquid product mix spreads out on the surface in a layer;

cooling the surface to a temperature low enough to at least partially freeze said layer to form a product body;

scraping the product body from said surface to said periphery as product body scrapings;

collecting the scrapings at a single selected location on said surface adjacent to said periphery to form consolidated scrapings thereat, and removing said consolidated scrapings from said selected location.

9. The method defined in claim 8 including the additional step of controlling the temperature of said surface and/or the residence time of the liquid product mix layer on said surface depending upon the composition of at least one of said liquid and said fluid ingredients.

10. A method of dispensing a food product comprising providing a substantially horizontal rotary surface having a central axis and a periphery;

rotating said surface about said axis;

depositing a selected amount of liquid product mix on said surface while said surface is rotating so that the liquid product mix spreads out on said surface and sets to form a relatively thin, at least partially solidified product body;

scraping the at least partially solidified product body into a linear ridge row of scrapings aligned with said axis on said surface, said ridge row having a radially inner end proximal to said axis and an outer end;

pushing said ridge row at the inner end thereof away from said axis to a selected location on said surface adjacent to said periphery to consolidate the ridge row at said selected location, and removing the consolidated ridge row from said selected location.

11. The method defined in claim 10 and further including cooling said surface to a temperature low enough to at least partially freeze the liquid product mix deposited on said surface to form a frozen product body.

12. A method of dispensing a food product comprising the steps of providing a rotary surface having a central axis and a periphery;

rotating the surface about said axis;

depositing a selected amount of liquid product mix on the rotary surface while said surface is rotating so that the liquid product mix spreads out on said surface and sets to form an at least partially solidified product layer;

scraping the at least partially solidified product layer into a ridge row of scrapings on said surface;

pushing the ridge row away from said axis into a forming cylinder located beyond said periphery thereby compacting the scrapings into a shaped solid body within the forming cylinder, and ejecting the shaped solid body from the forming cylinder as said food product.

13. Apparatus for dispensing a food product comprising a substantially horizontal rotary surface having a central axis and a periphery;

motive means for rotating the rotary surface about said axis;

depositing means spaced above the rotary surface for depositing a selected amount of liquid product mix on the rotary surface while said surface is rotating so that the liquid product mix spreads out on the rotary surface and sets to form a thin, at least partially solidified product body, and product delivery means disposed between said depositing means and the rotary surface, said delivery means including scraping means supported above the rotary surface and having a working edge engaging the rotary surface along a line extending substantially perpendicular to the direction of movement thereof while said rotary surface is rotating to scrape the at least partially solidified product body into a single ridge row on said rotary surface, pushing means for pushing said ridge row along said rotary surface as away from said axis to a selected location on said surface adjacent to said periphery so as to consolidate said scrapings, and removing means for removing said consolidated scrapings from said selected location as said food product.

14. The apparatus defined in claim 13 and further including means for cooling said rotary surface to a temperature low enough to at least partially freeze the liquid product mix deposited on said rotary surface to form a frozen product body.

15. Apparatus for dispensing a food product comprising a substantially horizontal rotary surface having a central axis and a periphery;

a motor for rotating the rotary surface about said axis;

a depositing device spaced above the rotary surface for depositing a selected amount of liquid product mix on the rotary surface while said rotary surface is rotating so that the liquid product mix spreads out on the rotary surface and sets to form a thin, at least partially solidified product body;

a scraper supported above the rotary surface and having a working edge engaging the rotary surface along a line extending substantially perpendicular to the direction of movement thereof while said rotary surface is rotating to scrape said at least partially solidified product layer into a single ridge row on the rotary surface, said ridge row having an inner end proximal to said axis;

a pushing device for pushing said ridge row at said inner end radially along said surface away from said axis to a selected location on said surface at the periphery thereof to consolidate to scrapings, and a removal device for removing the consolidated scrapings from said selected location as said food product.

16. The apparatus defined in claim 15 and further including a refrigeration system connected to said rotary surface for cooling said rotary surface to a temperature low enough to at least partially freeze the liquid product mix deposited on said rotary surface to form a product layer which is at least partially frozen.

17. Apparatus for dispensing a food product comprising a generally horizontal rotary surface having a central axis and a periphery;

a motor for rotating the rotary surface about said axis;

a depositing device spaced above the rotary surface for depositing a selected amount of liquid product mix on the rotary surface while the rotary surface is rotating so that the liquid product mix spreads out on the rotary surface and sets as an at least partially solidified product layer;

a scraping device supported above the rotary surface for scraping said product layer from said surface into a row of scrapings extending away from said axis, and a pushing device for pushing said row of scrapings toward a selected location at the periphery of said surface so as to consolidate said scrapings.

18. The apparatus defined in claim 17 and further including a cooling device connected to said rotary surface for cooling same to a freezing temperature.

19. The apparatus defined in claim 17 and further including a compacting device located adjacent to said surface periphery at said selected location for compacting said consolidated scrapings.

20. The apparatus defined in claim 17 and further including a controlling device for controlling the temperature of said surface and/or the residence time of said liquid product mix on said surface depending upon the composition of said liquid product mix.

* * * * *